(12) United States Patent
Breit et al.

(10) Patent No.: US 8,811,200 B2
(45) Date of Patent: Aug. 19, 2014

(54) PHYSICAL LAYER METRICS TO SUPPORT ADAPTIVE STATION-DEPENDENT CHANNEL STATE INFORMATION FEEDBACK RATE IN MULTI-USER COMMUNICATION SYSTEMS

(75) Inventors: Gregory Alan Breit, San Diego, CA (US); Sameer Vermani, San Diego, CA (US); Santosh Paul Abraham, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 363 days.

(21) Appl. No.: 12/884,854

(22) Filed: Sep. 17, 2010

(65) Prior Publication Data

US 2011/0069629 A1 Mar. 24, 2011

Related U.S. Application Data

(60) Provisional application No. 61/244,528, filed on Sep. 22, 2009, provisional application No. 61/304,929, filed on Feb. 16, 2010.

(51) Int. Cl.
*H04W 4/00* (2009.01)
(52) U.S. Cl.
USPC ........... 370/252; 370/271; 370/329; 370/341; 375/349; 455/69
(58) Field of Classification Search
None
See application file for complete search history.

(56) References Cited

U.S. PATENT DOCUMENTS

| | | | |
|---|---|---|---|
| 3,018,663 A | 1/1962 | Dunlop | |
| 3,534,264 A | 10/1970 | Blasbalg et al. | |
| 4,047,151 A | 9/1977 | Rydbeck et al. | |
| 4,131,765 A | 12/1978 | Kahn | |
| 4,256,925 A | 3/1981 | Goode | |
| 4,261,054 A | 4/1981 | Scharla-Nielsen | |
| 4,309,764 A | 1/1982 | Acampora | |
| 4,383,315 A | 5/1983 | Torng | |
| 4,491,947 A | 1/1985 | Frank | |
| 4,495,619 A | 1/1985 | Acampora | |
| 4,495,648 A | 1/1985 | Giger | |

(Continued)

FOREIGN PATENT DOCUMENTS

| | | |
|---|---|---|
| BR | 9607900 A | 1/1998 |
| BR | 9607621 A | 6/1998 |

(Continued)

OTHER PUBLICATIONS

International Search Report and Written Opinion—PCT/US2010/049622, International Search Authority—European Patent Office—Mar. 4, 2011.

(Continued)

*Primary Examiner* — Chi Pham
*Assistant Examiner* — Shick Hom
(74) *Attorney, Agent, or Firm* — Eric Ho

(57) ABSTRACT

Certain aspects of the present disclosure present physical layer metrics for supporting adaptive station-dependent channel state information feedback rate in multi-user communication systems. For certain aspects, the physical layer metrics may be calculated at the stations and communicated to the AP. For certain aspects, the metrics may be calculated at an access point utilizing information about channel characteristics of stations available at the access point.

43 Claims, 15 Drawing Sheets

(56) References Cited

U.S. PATENT DOCUMENTS

| | | | |
|---|---|---|---|
| 4,547,880 | A | 10/1985 | De Vita et al. |
| 4,675,863 | A | 6/1987 | Paneth et al. |
| 4,720,829 | A | 1/1988 | Fukasawa et al. |
| 4,756,007 | A | 7/1988 | Qureshi et al. |
| 4,785,450 | A | 11/1988 | Bolgiano et al. |
| 4,789,983 | A | 12/1988 | Acampora et al. |
| 4,817,089 | A | 3/1989 | Paneth et al. |
| 4,901,307 | A | 2/1990 | Gilhousen et al. |
| 4,901,319 | A | 2/1990 | Ross |
| 4,910,794 | A | 3/1990 | Mahany |
| 4,914,651 | A | 4/1990 | Lusignan |
| 4,931,250 | A | 6/1990 | Greszczuk |
| 4,939,731 | A | 7/1990 | Reed et al. |
| 4,991,184 | A | 2/1991 | Hashimoto |
| 5,003,534 | A | 3/1991 | Gerhardt et al. |
| 5,022,046 | A | 6/1991 | Morrow, Jr. |
| 5,038,399 | A | 8/1991 | Bruckert |
| 5,056,109 | A | 10/1991 | Gilhousen et al. |
| 5,093,924 | A | 3/1992 | Toshiyuki et al. |
| 5,101,501 | A | 3/1992 | Gilhousen et al. |
| 5,103,459 | A | 4/1992 | Gilhousen et al. |
| 5,115,429 | A | 5/1992 | Hluchyj et al. |
| 5,191,583 | A | 3/1993 | Pearson et al. |
| 5,204,876 | A | 4/1993 | Bruckert et al. |
| 5,235,614 | A | 8/1993 | Bruckert et al. |
| 5,267,261 | A | 11/1993 | Blakeney, II et al. |
| 5,267,262 | A | 11/1993 | Wheatley, III |
| 5,276,261 | A | 1/1994 | Mayer et al. |
| 5,280,472 | A | 1/1994 | Gilhousen et al. |
| 5,280,537 | A | 1/1994 | Sugiyama et al. |
| 5,289,527 | A | 2/1994 | Tiedemann, Jr. |
| 5,297,192 | A | 3/1994 | Gerszberg |
| 5,305,308 | A | 4/1994 | English et al. |
| 5,307,351 | A | 4/1994 | Webster |
| 5,317,123 | A | 5/1994 | Ito |
| 5,373,502 | A | 12/1994 | Turban |
| 5,375,123 | A | 12/1994 | Andersson et al. |
| 5,383,219 | A | 1/1995 | Wheatley, III |
| 5,386,589 | A | 1/1995 | Kanai |
| 5,396,516 | A | 3/1995 | Padovani et al. |
| 5,400,328 | A | 3/1995 | Burren et al. |
| 5,404,376 | A | 4/1995 | Dent |
| 5,412,687 | A | 5/1995 | Sutton et al. |
| 5,414,796 | A | 5/1995 | Jacobs et al. |
| 5,416,797 | A | 5/1995 | Gilhousen et al. |
| 5,425,051 | A | 6/1995 | Mahany |
| 5,434,860 | A | 7/1995 | Riddle |
| 5,442,625 | A | 8/1995 | Gitlin et al. |
| 5,459,727 | A | 10/1995 | Vannucci |
| 5,461,639 | A | 10/1995 | Wheatley, III |
| 5,465,388 | A | 11/1995 | Zicker |
| 5,469,471 | A | 11/1995 | Wheatley, III |
| 5,485,486 | A | 1/1996 | Gilhousen et al. |
| 5,491,837 | A | 2/1996 | Haartsen |
| 5,497,395 | A | 3/1996 | Jou |
| 5,504,773 | A | 4/1996 | Padovani et al. |
| 5,528,593 | A | 6/1996 | English et al. |
| 5,530,693 | A | 6/1996 | Averbuch et al. |
| 5,530,700 | A | 6/1996 | Tran et al. |
| 5,533,004 | A | 7/1996 | Jasper et al. |
| 5,535,239 | A | 7/1996 | Padovani et al. |
| 5,537,410 | A | 7/1996 | Li |
| 5,559,789 | A | 9/1996 | Nakano et al. |
| 5,564,080 | A | 10/1996 | Eul et al. |
| 5,566,175 | A | 10/1996 | Davis |
| 5,568,483 | A | 10/1996 | Padovani et al. |
| 5,577,022 | A | 11/1996 | Padovani et al. |
| 5,577,087 | A | 11/1996 | Furuya |
| 5,579,306 | A | 11/1996 | Dent |
| 5,594,720 | A | 1/1997 | Papadopoulos et al. |
| 5,594,949 | A | 1/1997 | Andersson et al. |
| 5,603,093 | A | 2/1997 | Yoshimi et al. |
| 5,604,730 | A | 2/1997 | Tiedemann, Jr. |
| 5,612,948 | A | 3/1997 | Fette et al. |
| 5,621,723 | A | 4/1997 | Walton, Jr. et al. |
| 5,621,752 | A | 4/1997 | Antonio et al. |
| 5,634,195 | A | 5/1997 | Sawyer |
| 5,638,412 | A | 6/1997 | Blakeney, II et al. |
| 5,648,955 | A | 7/1997 | Jensen et al. |
| 5,649,290 | A | 7/1997 | Wang |
| 5,654,979 | A | 8/1997 | Levin et al. |
| 5,666,649 | A | 9/1997 | Dent |
| 5,680,395 | A | 10/1997 | Weaver, Jr. et al. |
| 5,682,605 | A | 10/1997 | Salter |
| 5,697,053 | A | 12/1997 | Hanly |
| 5,699,365 | A | 12/1997 | Klayman et al. |
| 5,701,294 | A | 12/1997 | Ward et al. |
| 5,706,145 | A | 1/1998 | Hindman et al. |
| 5,710,768 | A | 1/1998 | Ziv et al. |
| 5,710,974 | A * | 1/1998 | Granlund et al. ............. 455/436 |
| 5,726,978 | A | 3/1998 | Frodigh et al. |
| 5,729,557 | A | 3/1998 | Gardner et al. |
| 5,734,646 | A | 3/1998 | I et al. |
| 5,734,647 | A | 3/1998 | Yoshida et al. |
| 5,745,480 | A | 4/1998 | Behtash et al. |
| 5,748,677 | A | 5/1998 | Kumar |
| 5,751,725 | A | 5/1998 | Chen |
| 5,757,367 | A | 5/1998 | Kapoor |
| 5,757,810 | A | 5/1998 | Fall |
| 5,764,687 | A | 6/1998 | Easton |
| 5,764,699 | A | 6/1998 | Needham et al. |
| 5,764,899 | A | 6/1998 | Eggleston et al. |
| 5,768,533 | A | 6/1998 | Ran |
| 5,771,226 | A | 6/1998 | Kaku |
| 5,771,451 | A | 6/1998 | Takai et al. |
| 5,771,461 | A | 6/1998 | Love et al. |
| 5,774,809 | A | 6/1998 | Tuutijarvi et al. |
| 5,781,539 | A | 7/1998 | Tanaka |
| 5,781,583 | A | 7/1998 | Bruckert et al. |
| 5,787,133 | A | 7/1998 | Marchetto et al. |
| 5,793,759 | A | 8/1998 | Rakib et al. |
| 5,799,005 | A | 8/1998 | Soliman |
| 5,802,046 | A | 9/1998 | Scott |
| 5,805,581 | A | 9/1998 | Uchida et al. |
| 5,805,585 | A | 9/1998 | Javitt et al. |
| 5,812,938 | A | 9/1998 | Gilhousen et al. |
| 5,822,315 | A | 10/1998 | De Seze et al. |
| 5,822,318 | A | 10/1998 | Tiedemann, Jr. et al. |
| 5,822,358 | A | 10/1998 | Johansen |
| 5,822,359 | A | 10/1998 | Bruckert et al. |
| 5,825,761 | A | 10/1998 | Tanaka et al. |
| 5,832,368 | A | 11/1998 | Nakano et al. |
| 5,835,508 | A | 11/1998 | Kushita |
| 5,842,113 | A | 11/1998 | Nanda et al. |
| 5,845,212 | A | 12/1998 | Tanaka |
| 5,848,357 | A | 12/1998 | Dehner et al. |
| 5,850,605 | A | 12/1998 | Souissi et al. |
| 5,857,147 | A | 1/1999 | Gardner et al. |
| 5,862,132 | A | 1/1999 | Blanchard et al. |
| 5,862,453 | A | 1/1999 | Love et al. |
| 5,870,393 | A | 2/1999 | Yano et al. |
| 5,872,775 | A | 2/1999 | Saints et al. |
| 5,878,038 | A | 3/1999 | Willey |
| 5,883,887 | A | 3/1999 | Take et al. |
| 5,896,561 | A | 4/1999 | Schrader et al. |
| 5,901,142 | A | 5/1999 | Averbuch et al. |
| 5,903,554 | A | 5/1999 | Saints |
| 5,914,950 | A | 6/1999 | Tiedemann, Jr. et al. |
| 5,914,959 | A | 6/1999 | Marchetto et al. |
| 5,918,184 | A | 6/1999 | Wang |
| 5,920,551 | A | 7/1999 | Na et al. |
| 5,923,650 | A | 7/1999 | Chen et al. |
| 5,930,288 | A | 7/1999 | Eberhardt |
| 5,933,421 | A | 8/1999 | Alamouti et al. |
| 5,933,462 | A | 8/1999 | Viterbi et al. |
| 5,933,787 | A | 8/1999 | Gilhousen et al. |
| 5,937,002 | A | 8/1999 | Andersson et al. |
| 5,937,357 | A | 8/1999 | Tanaka |
| 5,940,765 | A | 8/1999 | Haartsen |
| 5,943,327 | A | 8/1999 | Mademann |
| 5,943,331 | A | 8/1999 | Lavean |
| 5,946,346 | A | 8/1999 | Ahmed et al. |
| 5,946,356 | A | 8/1999 | Felix et al. |
| 5,946,621 | A | 8/1999 | Chheda et al. |

(56) References Cited

U.S. PATENT DOCUMENTS

| | | |
|---|---|---|
| 5,950,124 A | 9/1999 | Trompower et al. |
| 5,953,325 A | 9/1999 | Willars |
| 5,956,642 A | 9/1999 | Larsson et al. |
| 5,960,350 A | 9/1999 | Schorman et al. |
| 5,963,548 A | 10/1999 | Virtanen |
| 5,966,384 A | 10/1999 | Felix et al. |
| 5,974,106 A | 10/1999 | Dupont et al. |
| 5,978,657 A | 11/1999 | Suzuki |
| 5,991,627 A | 11/1999 | Honkasalo et al. |
| 6,002,919 A | 12/1999 | Posti |
| 6,005,856 A | 12/1999 | Jensen et al. |
| 6,026,081 A | 2/2000 | Hamabe |
| 6,028,852 A | 2/2000 | Miya et al. |
| 6,038,263 A | 3/2000 | Kotzin et al. |
| 6,052,594 A | 4/2000 | Chuang et al. |
| 6,067,324 A | 5/2000 | Harrison |
| 6,069,884 A | 5/2000 | Hayashi et al. |
| 6,073,025 A | 6/2000 | Chheda et al. |
| 6,088,324 A | 7/2000 | Sato |
| 6,088,335 A | 7/2000 | I et al. |
| 6,091,737 A | 7/2000 | Hong et al. |
| 6,091,757 A | 7/2000 | Cudak et al. |
| 6,097,704 A | 8/2000 | Jackson et al. |
| 6,101,394 A | 8/2000 | Illidge |
| 6,112,084 A | 8/2000 | Sicher et al. |
| 6,134,220 A | 10/2000 | Le Strat et al. |
| 6,137,789 A | 10/2000 | Honkasalo |
| 6,137,839 A | 10/2000 | Mannering et al. |
| 6,137,991 A | 10/2000 | Isaksson |
| 6,151,502 A | 11/2000 | Padovani et al. |
| 6,161,013 A | 12/2000 | Anderson et al. |
| 6,163,707 A | 12/2000 | Miller |
| 6,167,031 A | 12/2000 | Olofsson et al. |
| 6,173,005 B1 | 1/2001 | Kotzin et al. |
| 6,173,007 B1 | 1/2001 | Odenwalder et al. |
| 6,174,558 B1 | 1/2001 | Lamptey et al. |
| 6,175,448 B1 | 1/2001 | Xie et al. |
| 6,175,550 B1 | 1/2001 | Van Nee |
| 6,175,558 B1 | 1/2001 | Miya |
| 6,175,590 B1 | 1/2001 | Stein |
| 6,178,448 B1 | 1/2001 | Gray et al. |
| 6,179,007 B1 | 1/2001 | Cote |
| 6,188,906 B1 | 2/2001 | Lim et al. |
| 6,189,122 B1 | 2/2001 | Cheng |
| 6,212,176 B1 | 4/2001 | Andersson et al. |
| 6,212,988 B1 | 4/2001 | Chernyshov et al. |
| 6,215,988 B1 | 4/2001 | Matero |
| 6,219,343 B1 | 4/2001 | Honkasalo et al. |
| 6,222,832 B1 | 4/2001 | Proctor |
| 6,222,875 B1 | 4/2001 | Dahlman et al. |
| 6,233,231 B1 | 5/2001 | Felix et al. |
| 6,236,365 B1 | 5/2001 | LeBlanc et al. |
| 6,263,205 B1 * | 7/2001 | Yamaura et al. ............. 455/442 |
| 6,266,339 B1 | 7/2001 | Donahue et al. |
| 6,269,088 B1 | 7/2001 | Masui et al. |
| 6,272,124 B1 | 8/2001 | Ahn et al. |
| 6,285,655 B1 | 9/2001 | Lundby et al. |
| 6,285,886 B1 | 9/2001 | Kamel et al. |
| 6,307,844 B1 | 10/2001 | Tsunehara et al. |
| 6,307,851 B1 | 10/2001 | Jung et al. |
| 6,308,072 B1 | 10/2001 | Labedz et al. |
| 6,317,413 B1 | 11/2001 | Honkasalo |
| 6,317,435 B1 | 11/2001 | Tiedemann, Jr. et al. |
| 6,320,851 B1 | 11/2001 | Kim et al. |
| 6,335,922 B1 | 1/2002 | Tiedemann, Jr. et al. |
| 6,347,217 B1 | 2/2002 | Bengtsson et al. |
| 6,356,555 B1 | 3/2002 | Rakib et al. |
| 6,366,778 B1 | 4/2002 | Bender et al. |
| 6,377,809 B1 | 4/2002 | Rezaiifar et al. |
| 6,389,066 B1 | 5/2002 | Ejzak |
| 6,393,005 B1 | 5/2002 | Mimura |
| 6,400,695 B1 | 6/2002 | Chuah et al. |
| 6,434,367 B1 | 8/2002 | Kumar et al. |
| 6,434,380 B1 | 8/2002 | Andersson et al. |
| 6,434,637 B1 | 8/2002 | D'Errico |
| 6,438,115 B1 | 8/2002 | Mazur et al. |
| 6,445,908 B1 | 9/2002 | Glazko |
| 6,456,652 B1 | 9/2002 | Kim et al. |
| 6,470,024 B1 | 10/2002 | Hamalainen et al. |
| 6,470,044 B1 | 10/2002 | Kowalski |
| 6,483,825 B2 | 11/2002 | Seta |
| 6,487,259 B1 * | 11/2002 | Russo ............................ 375/341 |
| 6,496,543 B1 | 12/2002 | Zehavi |
| 6,501,958 B1 | 12/2002 | Hwang et al. |
| 6,512,925 B1 | 1/2003 | Chen et al. |
| 6,545,986 B1 | 4/2003 | Stellakis |
| 6,563,809 B1 | 5/2003 | Proctor, Jr. et al. |
| 6,567,374 B1 | 5/2003 | Bohnke et al. |
| 6,567,461 B1 | 5/2003 | Moon et al. |
| 6,570,860 B2 | 5/2003 | Hamalainen et al. |
| 6,574,211 B2 | 6/2003 | Padovani et al. |
| 6,574,266 B1 | 6/2003 | Haartsen |
| 6,574,267 B1 | 6/2003 | Kanterakis et al. |
| 6,577,618 B2 | 6/2003 | Diachina et al. |
| 6,580,899 B1 | 6/2003 | Dalgleish et al. |
| 6,590,873 B1 | 7/2003 | Li et al. |
| 6,606,311 B1 | 8/2003 | Wang et al. |
| 6,615,052 B1 | 9/2003 | Parmenter |
| 6,621,804 B1 | 9/2003 | Holtzman et al. |
| 6,625,433 B1 | 9/2003 | Poirier et al. |
| 6,636,496 B1 | 10/2003 | Cho et al. |
| 6,643,520 B1 | 11/2003 | Park et al. |
| 6,668,159 B1 | 12/2003 | Olofsson et al. |
| 6,711,150 B1 | 3/2004 | Vanghi |
| 6,711,415 B1 | 3/2004 | McCarthy |
| 6,717,926 B1 | 4/2004 | Deboille et al. |
| 6,725,043 B2 | 4/2004 | Bonta et al. |
| 6,728,233 B1 | 4/2004 | Park et al. |
| 6,757,270 B1 | 6/2004 | Kumar et al. |
| 6,760,587 B2 | 7/2004 | Holtzman et al. |
| 6,804,214 B1 | 10/2004 | Lundh et al. |
| 6,810,030 B1 | 10/2004 | Kuo |
| 6,834,047 B1 | 12/2004 | Yoon et al. |
| 6,850,506 B1 | 2/2005 | Holtzman et al. |
| 6,859,446 B1 | 2/2005 | Gopalakrishnan et al. |
| 6,894,994 B1 | 5/2005 | Grob et al. |
| 6,898,437 B1 | 5/2005 | Larsen et al. |
| 6,912,228 B1 | 6/2005 | Dahlman et al. |
| 6,917,808 B1 | 7/2005 | Nelson |
| 6,971,098 B2 | 11/2005 | Khare et al. |
| 6,973,062 B1 | 12/2005 | Han |
| 6,973,098 B1 | 12/2005 | Lundby et al. |
| 7,002,920 B1 | 2/2006 | Ayyagari et al. |
| 7,016,649 B1 | 3/2006 | Narasimhan et al. |
| 7,068,683 B1 | 6/2006 | Lundby et al. |
| 7,072,321 B2 | 7/2006 | Holtzman et al. |
| 7,072,322 B2 | 7/2006 | Holtzman et al. |
| 7,079,550 B2 | 7/2006 | Padovani et al. |
| 7,133,460 B2 | 11/2006 | Bae et al. |
| 7,154,846 B2 | 12/2006 | Chen et al. |
| 7,184,426 B2 | 2/2007 | Padovani et al. |
| 7,194,006 B2 | 3/2007 | Wong et al. |
| 7,289,473 B1 | 10/2007 | Padovani et al. |
| 7,349,714 B2 | 3/2008 | Lee et al. |
| 7,397,767 B2 * | 7/2008 | Taffin et al. ................. 370/252 |
| 7,499,427 B2 | 3/2009 | Padovani et al. |
| 7,848,282 B2 | 12/2010 | Padovani et al. |
| 7,848,283 B2 | 12/2010 | Padovani et al. |
| 7,848,284 B2 | 12/2010 | Padovani et al. |
| 7,848,285 B2 | 12/2010 | Padovani et al. |
| 7,995,531 B2 | 8/2011 | Padovani et al. |
| 8,005,042 B2 | 8/2011 | Padovani et al. |
| 8,009,625 B2 | 8/2011 | Padovani et al. |
| 8,064,409 B1 | 11/2011 | Gardner et al. |
| 8,068,453 B2 | 11/2011 | Holtzman et al. |
| 8,077,655 B2 | 12/2011 | Padovani et al. |
| 8,089,924 B2 | 1/2012 | Padovani et al. |
| 8,102,882 B2 * | 1/2012 | Wang et al. .................. 370/482 |
| 2001/0033558 A1 | 10/2001 | Matsuki |
| 2001/0046879 A1 | 11/2001 | Schramm et al. |
| 2002/0160781 A1 | 10/2002 | Bark et al. |
| 2002/0196768 A1 | 12/2002 | Ohgoshi et al. |
| 2004/0224719 A1 | 11/2004 | Nounin et al. |
| 2005/0254465 A1 | 11/2005 | Lundby et al. |

(56) References Cited

U.S. PATENT DOCUMENTS

| | | | |
|---|---|---|---|
| 2006/0187877 A1 | 8/2006 | Lundby et al. | |
| 2006/0280160 A1 | 12/2006 | Padovani et al. | |
| 2007/0025267 A1 | 2/2007 | Padovani et al. | |
| 2008/0008136 A1 | 1/2008 | Padovani et al. | |
| 2008/0101303 A1 | 5/2008 | Kim | |
| 2008/0298382 A1* | 12/2008 | Galli et al. | 370/438 |
| 2008/0318562 A1* | 12/2008 | Featherstone et al. | 455/418 |
| 2009/0310588 A1 | 12/2009 | Padovani et al. | |
| 2010/0023644 A1* | 1/2010 | Laffra et al. | 709/232 |
| 2010/0323748 A1 | 12/2010 | Padovani et al. | |
| 2012/0033628 A1* | 2/2012 | Eriksson et al. | 370/329 |
| 2013/0094391 A1 | 4/2013 | Padovani et al. | |

FOREIGN PATENT DOCUMENTS

| | | |
|---|---|---|
| CA | 2239524 A1 | 1/1999 |
| CA | 2427007 A1 | 6/2002 |
| CN | 1144444 A | 3/1997 |
| CN | 1256817 | 6/2000 |
| CN | 1269934 A | 10/2000 |
| CN | 101523748 A | 9/2009 |
| DE | 19913086 A1 | 10/2000 |
| EP | 0353759 A2 | 2/1990 |
| EP | 0412583 A2 | 2/1991 |
| EP | 0418865 A2 | 3/1991 |
| EP | 0600713 A2 | 6/1994 |
| EP | 0656716 A1 | 6/1995 |
| EP | 0716520 A1 | 6/1996 |
| EP | 0720407 A2 | 7/1996 |
| EP | 0729240 A2 | 8/1996 |
| EP | 0762703 A1 | 3/1997 |
| EP | 0767548 | 4/1997 |
| EP | 0779755 A2 | 6/1997 |
| EP | 0847147 A2 | 6/1998 |
| EP | 0887947 A2 | 12/1998 |
| EP | 0899906 A2 | 3/1999 |
| EP | 0924878 A2 | 6/1999 |
| EP | 0936753 A2 | 8/1999 |
| EP | 1022862 | 7/2000 |
| GB | 715435 A | 9/1954 |
| GB | 2293947 | 4/1996 |
| GB | 2303769 A | 2/1997 |
| GB | 2311702 | 10/1997 |
| JP | 1051354 C | 11/1977 |
| JP | 57159148 A | 10/1982 |
| JP | 59039150 A | 3/1984 |
| JP | 63141432 A | 6/1988 |
| JP | 63184420 | 7/1988 |
| JP | 63252047 A | 10/1988 |
| JP | 01122242 | 5/1989 |
| JP | 01170147 | 7/1989 |
| JP | 2035848 A | 2/1990 |
| JP | 3060251 A | 3/1991 |
| JP | 05276132 | 10/1993 |
| JP | 6318927 A | 11/1994 |
| JP | 8125604 A | 5/1996 |
| JP | 8506467 | 7/1996 |
| JP | 8274756 A | 10/1996 |
| JP | 8335899 A | 12/1996 |
| JP | 9008770 A | 1/1997 |
| JP | 0983600 | 3/1997 |
| JP | 9074378 | 3/1997 |
| JP | 09093652 | 4/1997 |
| JP | 9186646 | 7/1997 |
| JP | 9191276 A | 7/1997 |
| JP | 9200825 A | 7/1997 |
| JP | 1098763 | 4/1998 |
| JP | 10107769 A | 4/1998 |
| JP | 10155179 A | 6/1998 |
| JP | 10190625 | 7/1998 |
| JP | 10285138 A | 10/1998 |
| JP | H1146198 A | 2/1999 |
| JP | H11046196 A | 2/1999 |
| JP | 11098574 A | 4/1999 |
| JP | 11154904 A | 6/1999 |
| JP | 11234202 | 8/1999 |
| JP | 11284570 | 10/1999 |
| JP | 2000091985 | 3/2000 |
| JP | 2000165927 A | 6/2000 |
| JP | 2000224231 A | 8/2000 |
| JP | 2002152849 A | 5/2002 |
| JP | 2007335994 A | 12/2007 |
| JP | 2008099317 A | 4/2008 |
| JP | 4339508 | 7/2009 |
| JP | 4382868 | 10/2009 |
| JP | 4594442 | 9/2010 |
| JP | 4594443 | 9/2010 |
| JP | 2011035828 A | 2/2011 |
| KR | 200011799 | 2/2000 |
| RU | 2139636 C1 | 10/1999 |
| RU | 2146850 C1 | 3/2000 |
| SU | 462292 A1 | 2/1975 |
| SU | 1585902 A1 | 8/1990 |
| WO | WO9222162 | 12/1992 |
| WO | WO9418771 A1 | 8/1994 |
| WO | WO9428643 | 12/1994 |
| WO | WO9500821 A1 | 1/1995 |
| WO | WO9503652 A1 | 2/1995 |
| WO | WO9507578 | 3/1995 |
| WO | WO9512938 | 5/1995 |
| WO | WO9528814 A1 | 10/1995 |
| WO | WO9600466 | 1/1996 |
| WO | WO9608908 A2 | 3/1996 |
| WO | WO9610320 | 4/1996 |
| WO | WO-9631013 A1 | 10/1996 |
| WO | WO9709810 A1 | 3/1997 |
| WO | WO9711535 | 3/1997 |
| WO | WO9715131 A2 | 4/1997 |
| WO | WO9737443 A1 | 10/1997 |
| WO | WO9740592 A1 | 10/1997 |
| WO | WO9819405 | 5/1998 |
| WO | WO9835514 | 8/1998 |
| WO | WO9852307 A1 | 11/1998 |
| WO | WO9852327 A2 | 11/1998 |
| WO | 9859449 | 12/1998 |
| WO | WO9859443 A1 | 12/1998 |
| WO | WO9859451 A1 | 12/1998 |
| WO | WO9903225 A1 | 1/1999 |
| WO | WO9914975 | 3/1999 |
| WO | WO9918684 A1 | 4/1999 |
| WO | WO9918702 | 4/1999 |
| WO | WO9923844 | 5/1999 |
| WO | WO9943101 | 8/1999 |
| WO | WO9949588 | 9/1999 |
| WO | WO9966744 A1 | 12/1999 |
| WO | WO0004728 | 1/2000 |
| WO | WO0008706 A2 | 2/2000 |
| WO | WO0014899 | 3/2000 |
| WO | WO0014908 A1 | 3/2000 |
| WO | WO0033472 A1 | 6/2000 |
| WO | WO0033480 | 6/2000 |
| WO | WO0041542 | 7/2000 |
| WO | WO0041543 | 7/2000 |
| WO | WO0042810 | 7/2000 |
| WO | WO0152425 | 7/2001 |
| WO | WO0180445 A2 | 10/2001 |
| WO | WO0235735 | 5/2002 |
| WO | WO-2008018761 A2 | 2/2008 |
| WO | WO2008051466 A2 | 5/2008 |
| WO | WO2008054099 A1 | 5/2008 |

OTHER PUBLICATIONS

3GPP TS 25.101 V6.10.0, 3rd Generation Partnership Project; Technical Specification Group Radio Access Network; User Equipment (UE) radio transmission and reception (FDD) (Release 6) Section 9.3, Dec. 2005.

3GPP TS 25.214 V6.7.1 3rd Generation Partnership Project; Technical Specification Group Radio Access Network; Physical layer procedures (FDD) (Release 6), Section 6A.2, Dec. 2005.

Acampora, "A Wireless Network for Wide-Band Indoor Communications," IEEE Journal on Selection Areas in Communications, vol. SAC-5, Jun. 1987.

(56) References Cited

OTHER PUBLICATIONS

Acampora, "The Use of Resource Sharing and Coding to Increase the Capacity of Digital Satellites," IEEE Journal on Selected Areas in Communications, vol. SAC-1 No. 1, Jan. 1983.
Adachi, F., et al., "Wideband Multi-rate DS-CDMA for Next Generation Mobile Communications Systems," Wireless Communications Conference (1997). Boulder, CO, USA Aug. 11-13, 1997, New York, NY, USA, IEEE, (Aug. 11, 1997), pp. 57-62, XP010245557, DOI:10.1109/WCC.1997.622247, ISBN: 978-0-7803-41 94-4.
Ariyavisitakul, et al.: "Network Synchronization of Radio Ports in Wireless Personal Communications", Electronic Letters 28(25): 2312-2314 (1992).
Bi Q et al.: "The performance of DS-CDMA for wireless local loop" Spread Spectrum Techniques and Applications Proceedings, 1996., IEEE 4th International Symposium on Mainz, Germany Sep. 22-25, 1996, New York, NY, USA,IEEE, US, vol. 3, Sep. 22, 1996, pp. 1330-1333.
Bruhn, S. et al., "Concepts and Solutions for Link Adaption and Inband Signaling for the GSM AMR Speech Coding Standard," IEEE 49th Vehicular Technology Conference, vol. 3, XP002901443, May 16, 1999, pp. 2451-2455, doi: 10.1109/VETEC.1999.778517.
Buchholz et al., "Real-Time Management of Radio Turnaround in a TDMA/TDD System" MO-LA Technical Developments vol. 22 Jun. 1994.
"CDMA2000 High Rate Packet Data Air Interface Specification," C.S0024 Version 2.0, Published Oct. 27, 2000 by 3rd Generation Partnershp Project 2. Section 8.2.1.3.3.2, 8.2.1.3.3.3, 9.2.1.3.3.2, 9.2.3.3.3.
Chuang J C-I et al.: "Uplink power control for TDMA portable radio channels" Proceedings of the International Conference on Communications (ICC). Geneva, May 23-26, 1993, New York, IEEE, US, vol. vol. 3, May 23, 1993, pp. 584-588.
Eng et al: "Comparison of Hybrid FDMA/CDMA Systems in Frequency Selective Rayleigh Fading" IEEE J. of Selected Areas of Communications 12(5): 938-951 (1994).
ETSI EN 301 709, V.7.0.2: "Digital cellular telecommunications system (Phase 2+); Link Adaptation (GSM 05.09 version 7.0.2 Release 1998)," (Dec. 1, 1999), pp. 1-13, XP002177164.
Falahati, et al., "Implementation of Adaptive 5400 bit/s Modem Frequency Selective HF Radio Links", Electronic Letters: An International Publication, vol. 28, No. 13, Jun. 18, 1992, pp. 1238-1240.
Fifer, et al., "The Low-Cost Packet Radio," Proceedings of the IEEE, vol. 75, No. 1 Jan. 1987.
Filip, et al., "Adaptive Modulation as a Fade Countermeasure. An Olympus Experiment," International Journal of Satellite Communications, vol. 8, 31-41 (1990).
Fischer et al., "Wide-Band Packet Radio for Multipath Environments", IEEE Transactions on Communications, vol. 36, No. 5, pp. 564-576, May 15, 1988.
Fischer et al., "Wide-Band Packet Radio Technology", IEEE Transactions on Communications, vol. 75, No. 1, Jan. 1987.
Foerster et al: "Analysis of Hybrid Coherent FDMA/CDMA Systems in Ricean Multipath Fading" IEEE Transactions on Communications 45(1): 15-18 (1997).
Forney, et al., "Efficient Modulation for Band-Limited Channels", IEEE Journal on Selected Areas in Communications, vol. sac-2, No. 5, Sep. 1984.
Goodman, "Embedded DPCM for variable bit rate transmission", IEEE Transactions on Communications, vol. com-28, No. 7, Jul. 1980.
Goodman, et al.: "Quality of service and bandwith efficiency of cellular mobile radio with variable bit-rate speech transmission", IEEE Trans. on Vehicular Technology, Aug. 1983, vol. VT-32, No. 3, pp. 211-217.
Harper, R.C., "Adaptive Phase and Amplitude Modulation on a Frequency Dispersive Fading Channel", IEEE Transactions on Communications, vol. Com-22, No. 6, Jun. 1974.
Hayes Microcomputer Products, Inc., Smartmodem 1200B Hardware Reference Manual, Norcross, GA, 1986.

Haykin: "An Introduction to Analog and Digital Communications" 1989, John Wiley and Sons, Inc., p. 558.
Heegard, et al., "A Microprocessor-Based PSK Modem for Packet Transmission Over Satellite Channels", IEEE Transactions on Communications, vol. com-26, No. 5, May 1978.
Henry, et al., "HF Radio Data Communication: CW to Clover", Communications Quarterly, Spring 1992, pp. 11-24.
Hirade, et al., "Digital Transmission Technology for Mobile Radio Communication," Regular Members (Yokosuga Electrical Communication Laboratory, NTT, Yokosuga-shi), Feb. 1982.
Huang, Chenhong. "An Analysis of CDMA 3G Wireless Communications Standards," 1999 IEEE 49th Vehicular Technology Conference, United States of America, IEEE, Jul. 1999, vol. 1, pp. 342-345.
ITU-T V. 32, "Data communication over the telephone network: A family of 2-wire, duplex modems operating at data signalling rates of up to 9600 bit/s for use on the general switched telephone network and on leased telephone type circuits," V. 32, Mar. 1993.
ITU-T V.22 bis, "Data Communication Over the Telephone Network", 2400 Bits Per Second Duplex Modem Using the Frequency Division Technique Standardized for Use on the General Switched Telephone Network and on Point-To-Point 2-Wire Leased Telephone-Type Circuits, 1993.
Jacobsmeyer, "Adaptive Trellis Coded Modulation for Bandlimited Meteor Burst Channels", 1989 IEEE Military Communications Conference (MILCOM '89), vol. 2, pp. 418-422 (Cat. No. 89CH2681-5).
Jacobsmeyer, "Adaptive Trellis Coded Modulation for Bandlimited Meteor Burst Channels", IEEE Journal on Selecte Areas in Communications, vol. 10, No. 3, Apr. 1992.
Jacobsmyer, J.M., "An Adaptive Modulation Scheme for Bandwidth-Limited Meteor-Burst Channels" 21st Century Military Communications—What's Possible, San Diego, Oct. 23-26, 1988, vol. 3, Oct. 23, 1988, pp. 933-937 IEEE.
Jalali et al: "Performance Comparison of Direct Spread and Multicarrier CDMA Systems" IEEE: 2042-2046 (1998).
Jentz, "Method to conserve power in subscribers using C/I+N detection algorithm", Motorola Technical Developments, vol. 21, Feb. 1994.
Khan, et al., "Adaptive Forward Error Control for Digital Satellite Systems," IEEE Transactions of Aerospace and Electronics Systems, vol. AES-21, No. 4, Jul. 1985.
Kim et al: "The Performance Improvement of a Multicarrier DS-CDMA System Using Both Time-Diversity and Frequency Offset" ETRI J.21(4): 29-40 (1999).
Kinsely, D.N., et al. CDMA 2000: "A Third-Generation Radio Transmission Technology," Bell Labs Technical Journal, Bell Laboratories, US. vol. 3, No. 3, Jul. 1, 1998, pp. 63-78.
Kondo et al: "Performance of Multicarrier DS CDMA Systems" IEEE Transactions on Communications 44(2):238-246 (1996).
Lagarde, P, et al., "The PR4G VHF ECCM System: Extensive Tactical Communications for the Battlefield" Military Communications Conference, 1992. MILCOM '92, Conference Record. Communications—Fusing Command, Control and Intelligence., IEEE San Diego, CA, USA Oct. 11-14, 1992, New York, NY, USA, IEEE, US, Oct. 11, 1992, pp. 662-666, XP010060937.
Lee et al: "Direct Sequence Spread Spectrum Walsh-QPSK Modulation" IEEE Transactions on Communications 46(9): 1227-1232 (1998).
Lee et al: "Performance of a Modified Multicarrier Direct Sequence CDMA System" ETRI J.19(1): 1-11 (1997).
Lin, et al., "An Adaptive ARQ Scheme Using Pragmatic TCM", Singapore ICCS 1994 Conference Proceedings, vol. 2, Nov. 14-18, pp. 649-652.
Ling, Fuyun "A Matched Filter Bound Analysis of Single and Multi-Carrier DS CDMA Communications" 1997 Asia Pacific Microwave Conference pp. 161-164.
Massoumi, et al.: "Adaptive Trellis Coded Modulation for Mobile Communications", IEEE Pacific Rim Conference on Communications, Computers and Signal Processing, May 9-10, 1991, pp. 538-541.
Milstein, et al., "Performance of Meteor-Burst Communication Channels", IEEE Journal on Selected Areas in Communicaions, vol. sac-5, No. 2, Feb. 1987.

(56) References Cited

OTHER PUBLICATIONS

Murphy, "Telecommunications Talk," Creative Computing, Jan. 1985, vol. 11, No. 1, pp. 16-22.

Oetting, "An Analysis of Meteor Burst Communications for Military Applications", IEEE Transactions on Communications, vol. com-28, No. 9, Sep. 1980.

Petit, "Clover II: A Technical Overview, AARL Amateur Radio," San Jose, California, Sep. 27-29, 1991.

Petit, "The "CLOVERLEAF" Performance-Oriented HF Data Communication System," 9th Computer Networking Conference, Sep. 22, 1990, pp. 191-202.

Prasad, R. et al., "An Overview of CDMA Evolution Toward Wideband CDMA", IEEE Communications Survey, 1998, pp. 2-29, vol. 1. No. 1.

Ristenbatt, et al., "Performance Criteria for Spread Spectrum Communications", IEEE Transactions on Communications, vol. com-25, No. 8, pp. 756-763, Aug. 1977.

Rowitch et al: "Coded Multicarrier DS-CDMA in the Presence of Partial Band Interference" IEEE pp. 204-209 (1996).

Rozenstrauch et al., "Control Channel Interference Detection in TDMA Systems with Frequency Re-Use", Motorola, Inc, Technical Developments, Nov. 1995.

Salz, et al., "An Experimental Digital Multilevel FM Modem", IEEE Transactions on Communications, vol. com-14, No. 3, Jun. 1966, pp. 259-265.

Shinsuke Hara & Ramjee Prasad, Overview of Multicarrier CDMA, IEEE Comm. Mag., Dec. 1997, at 126.

Steele, "Deploying Personal Communication Network," Proceedings Wireless 91, The Third National Seminar & Workshop on Wireless Personal Communications, Sep. 1990, pp. 2,12-15, ISSN 0163-6804.

Steele, et al., "Variable Rate QAM for Data Transmission Over Rayleigh Fading Channels," Proceedings Wireless 91, The Third National Seminar & Workshop on Wireless Personal Communications, pp. 1-14, 1991.

Telecommunications Industry Association, Mobile Station-Base Station Compatibility Standard for Dual-Mode Wideband Spread Spectrum Cellular System, TIA/EIA-95, Jul. 1993, 668 pages.

Thomas, et al., "A New Generation of Digital Microwave Radios for U.S. Military Telephone Networks," IEEE Transactions on Communications, vol. COM-27, No. 12, Dec. 1979.

Thomspon et al., "Analysis of diversity reception improvements in spread spectrum receivers", Proceedings of the IEEE 3rd International Symposium on Spread Spectrum Techniques and Applications, vol. 2, pp. 455-459, Jul. 4-6, 1994, Oulu, Finalnd.

Tiedemann, Ed. "Using a 1X Reverse Link with a 3X Forward Link," 3GPP2 TSG-C Contribution, Aug. 19, 1999, 3GPP2-C30-19990817-038, URL: ftp://ftp.3gpp2.org/TSGC/Working/1999/TSG-C_9908/TSG-C.3/C30-19990817-038%20QCOM%201X_RL.doc.

Tyson, Tom: "A Method for Improved Site Selection in a Cell-Based TDMA Fail-Soft System" Motorola Technical Developments; Dec. 1, 1997, pp. 194-195.

Vos, "Minimum Distance Channel Quality Metric", Motorola, Inc., Technical Developments, vol. 20, Oct. 1993, pp. 8-9.

Webb, "QAM: The Modulation Scheme for Future Mobile Radio Communications", Electronics & Communication Engineering Journal, Aug. 1992, pp. 167-176.

Weitzen, et al., "A High Speed Digital Modem for the Meteor Scatter Channel", Proceedings of the Seventeenth Annual Conference on Information Science and Systems, Mar. 23-25, 1983.

Weitzen, "Feasibility of high speed digital communications on the meteor scatter channel", University of Wisconsin, 1983.

West, R. L., Abstract, "Data Concentration Method", IBM Technical Disclosure Bulletin, Originally disclosed by IBM on Jul. 1, 1975, pp. 487-489 (3 pages).

Xu et al: "On the Performance of Multicarrier RAKE Systems" IEEE pp. 295-299 (1997).

Xu et al: "Performance of Multicarrier DS CDMA Systems in the Presence of Correlated Fading" IEEE pp. 2050-2054 (1997).

Zhang, et al.: "An Integrated Voice/Data System for mobile indoor Radio Networks Using Multiple Transmission Rate", Global Telecommunications Conference. IEEE, Nov. 27-30, 1989, Dallas, TX, vol. 3, pp. 1366-1370.

Ziemer et al: "Effect of Correlation Between Subcarriers of an MCM/DSSS Communication System" IEEE pp. 146-150 (1996).

\* cited by examiner

US 8,811,200 B2

PHYSICAL LAYER METRICS TO SUPPORT ADAPTIVE STATION-DEPENDENT CHANNEL STATE INFORMATION FEEDBACK RATE IN MULTI-USER COMMUNICATION SYSTEMS

CLAIM OF PRIORITY UNDER 35 U.S.C. §119

The present Application for Patent claims benefit of U.S. Provisional Patent Application Ser. No. 61/244,528, entitled, "Physical Layer Metrics to Support Adaptive Station-Dependent Channel State Information Feedback Rate in Multi-User Communication Systems," filed Sep. 22, 2009, and U.S. Provisional Patent Application Ser. No. 61/304,929, entitled, "Physical Layer Metrics to Support Adaptive Station-Dependent Channel State Information Feedback Rate in Multi-User Communication Systems," filed Feb. 16, 2010, both assigned to the assignee hereof and hereby expressly incorporated by reference herein.

TECHNICAL FIELD

Certain aspects of the present disclosure generally relate to wireless communications and, more particularly, to designing physical layer metrics to support an adaptive station-dependent channel state information feedback rate in multi-user communication systems.

BACKGROUND

In order to address the issue of increasing bandwidth requirements that are demanded for wireless communications systems, different schemes are being developed to allow multiple user terminals to communicate with a single access point (AP) by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical and Electronic Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

A MIMO wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all practical purposes, $N_S \leq \min\{N_T, N_R\}$. The $N_S$ spatial streams may be used to transmit $N_S$ independent data streams to achieve greater overall throughput.

In wireless networks with a single Access Point and multiple stations, concurrent transmissions may occur on multiple channels toward different stations, both in the uplink (UL) and downlink (DL) direction. Many challenges are presented in such systems. For example, an access point may transmit signals using different standards such as the IEEE 802.11n/a/b/g or the IEEE 802.11ac standards. The receiver should be able to detect the transmission mode of the signal based on the information included in the preamble of the packet.

SUMMARY

Certain aspects of the present disclosure provide a method for wireless communications by a first apparatus. The method generally includes obtaining a current channel estimate, obtaining a recent channel estimate that was communicated to a second apparatus, and calculating a first metric based at least on the current channel estimate or the recent channel estimate, wherein the first metric is used for determining whether a channel state information (CSI) update is to be sent to the second apparatus.

Certain aspects of the present disclosure provide an apparatus for wireless communications. The apparatus generally includes an estimator configured to obtain a current channel estimate, wherein the estimator is also configured to obtain a recent channel estimate that was communicated to another apparatus, and a circuit configured to calculate a first metric based at least on the current channel estimate or the recent channel estimate, wherein the first metric is used for determining whether a channel state information (CSI) update is to be sent to the other apparatus.

Certain aspects of the present disclosure provide an apparatus for wireless communications. The apparatus generally includes means for obtaining a current channel estimate, means for obtaining a recent channel estimate that was communicated to another apparatus, and means for calculating a first metric based at least on the current channel estimate or the recent channel estimate, wherein the first metric is used for determining whether a channel state information (CSI) update is to be sent to the other apparatus.

Certain aspects of the present disclosure provide a computer-program product for wireless communications. The computer-program product includes a computer-readable medium comprising instructions executable to obtain a current channel estimate, obtain a recent channel estimate that was communicated to a second apparatus, and calculate a first metric based at least on the current channel estimate or the recent channel estimate, wherein the first metric is used for determining whether a channel state information (CSI) update is to be sent to the second apparatus.

Certain aspects of the present disclosure provide a wireless node. The wireless node generally includes at least one antenna, an estimator configured to obtain a current channel estimate, wherein the estimator is also configured to obtain a recent channel estimate that was communicated to an access point, and a circuit configured to calculate a first metric based at least on the current channel estimate or the recent channel estimate, wherein the first metric is used for determining whether a channel state information (CSI) update is to be sent via the at least one antenna to the access point.

Certain aspects of the present disclosure provide a method for wireless communications. The method generally includes obtaining a current channel estimate and a recent channel estimate from an apparatus, and calculating a first metric based at least on the current channel estimate or the recent channel estimate, wherein the first metric is used for determining whether a channel state information (CSI) update is to be requested from the apparatus.

Certain aspects of the present disclosure provide an apparatus for wireless communications. The apparatus generally includes a receiver configured to obtain a current channel estimate and a recent channel estimate from another apparatus, and a circuit configured to calculate a first metric based at least on the current channel estimate or the recent channel estimate, wherein the first metric is used for determining whether a channel state information (CSI) update is to be requested from the other apparatus.

Certain aspects of the present disclosure provide an apparatus for wireless communications. The apparatus generally includes means for obtaining a current channel estimate and a recent channel estimate from another apparatus, and means for calculating a first metric based at least on the current channel estimate or the recent channel estimate, wherein the first metric is used for determining whether a channel state information (CSI) update is to be requested from the other apparatus.

Certain aspects of the present disclosure provide a computer-program product for wireless communications. The computer-program product includes a computer-readable medium comprising instructions executable to obtain a current channel estimate and a recent channel estimate from an apparatus, and calculate a first metric based at least on the current channel estimate or the recent channel estimate, wherein the first metric is used for determining whether a channel state information (CSI) update is to be requested from the apparatus.

Certain aspects of the present disclosure provide an access point. The access point generally includes at least one antenna, a receiver configured to obtain via the at least one antenna a current channel estimate and a recent channel estimate from a wireless node, and a circuit configured to calculate a first metric based at least on the current channel estimate or the recent channel estimate, wherein the first metric is used for determining whether a channel state information (CSI) update is to be requested from the wireless node.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support 802.11n or earlier versions of the Institute of Electrical and Electronics Engineers (IEEE) 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA) or some other standards. An OFDM system may implement IEEE 802.11 or some other standards. A TDMA system may implement GSM or some other standards. These various standards are known in the art.

An Example MIMO System

Figure 1:
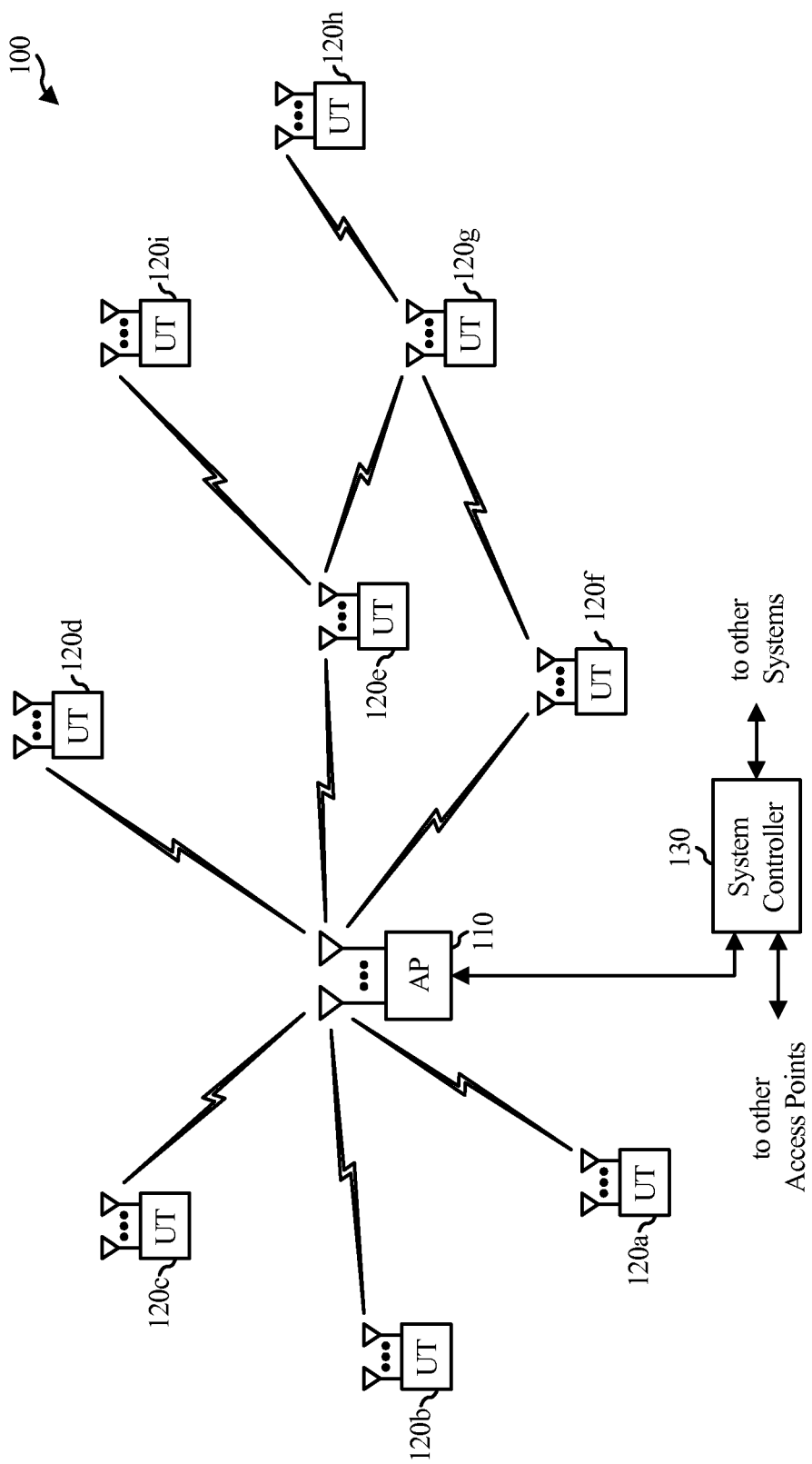
FIG. 1 illustrates a diagram of a wireless communications network in accordance with certain aspects of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink (UL) transmissions. In certain cases, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
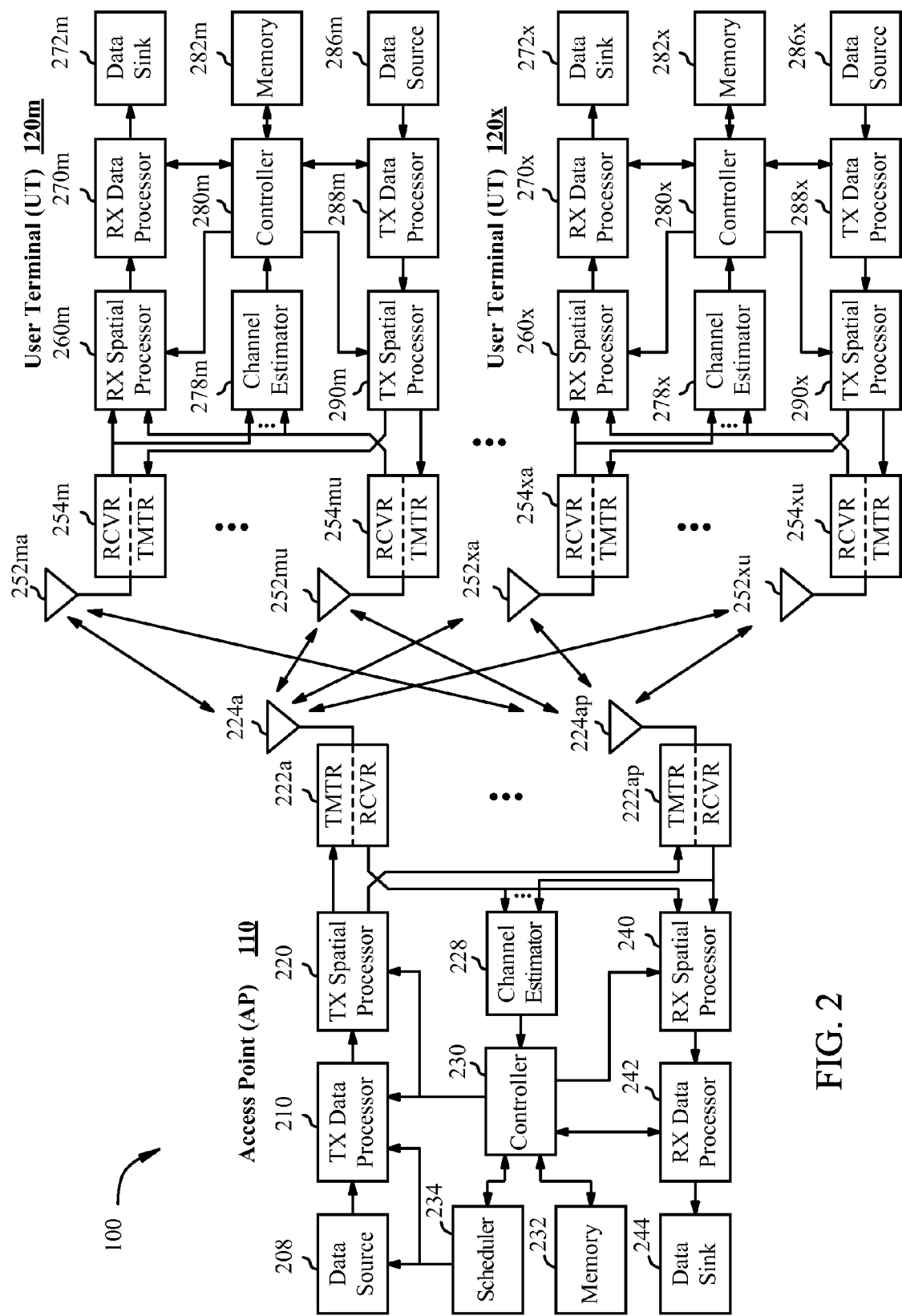
FIG. 2 illustrates a block diagram of an example access point and user terminals in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE or some other technique. An RX data processor 270 processes (e.g., demodulates, deinterleaves, and decodes) the recovered downlink data symbol stream to obtain decoded data for the user terminal.

Figure 3:
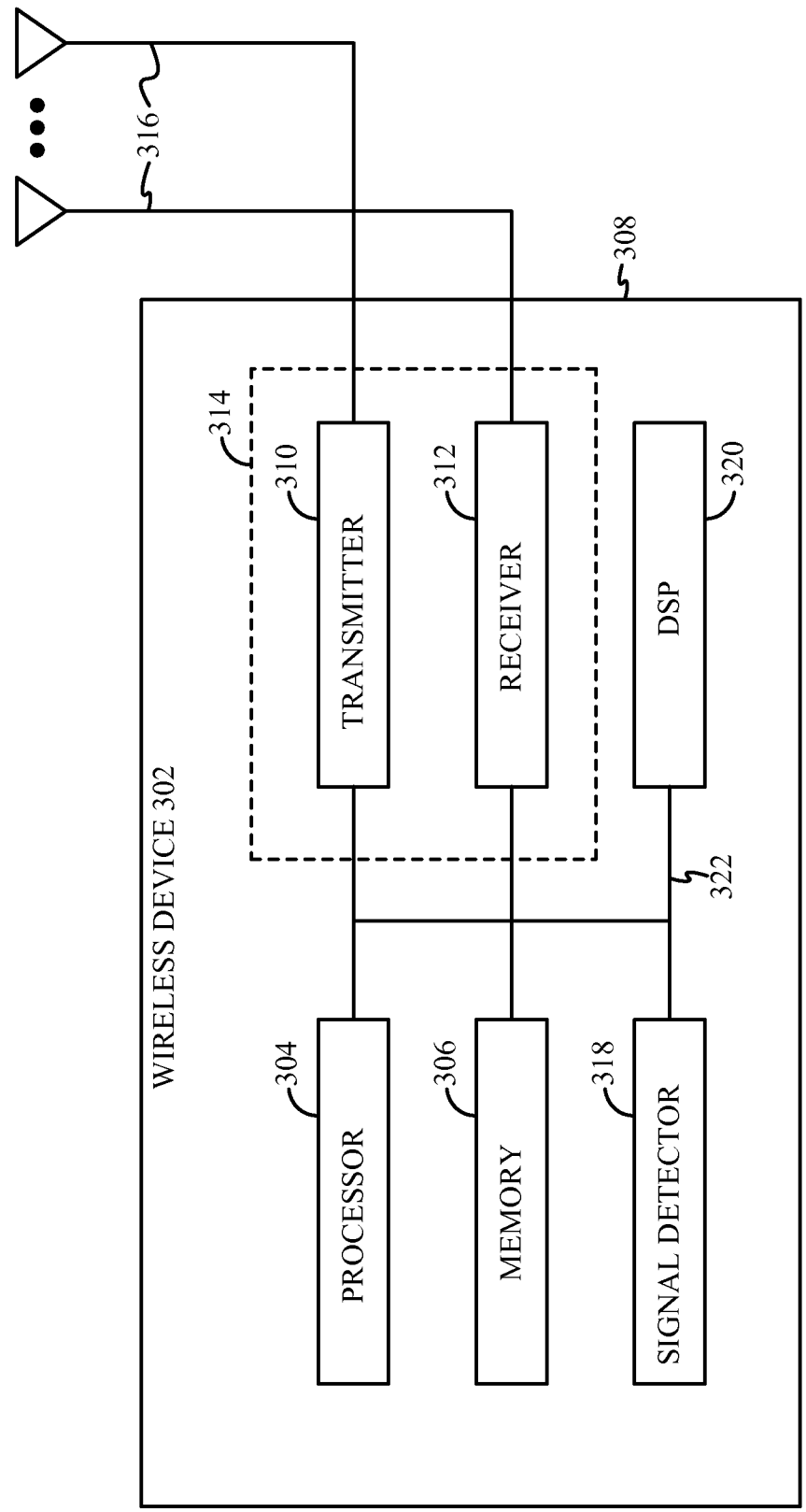
FIG. 3 illustrates a block diagram of an example wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Those skilled in the art will recognize the techniques described herein may be generally applied in systems utilizing any type of multiple access schemes, such as SDMA, OFDMA, CDMA, SDMA and combinations thereof.

Certain aspects of the present disclosure provide a protocol that allows user-dependent channel state information (CSI) feedback rates in a downlink SDMA system to improve system performance. In addition, certain aspects propose physical layer metrics that may be used by an access point or a station to determine the CSI feedback rate for each station.

A downlink multi-user MIMO (MU-MIMO) or SDMA system may serve multiple spatially separated stations simultaneously by transmit-beamforming from an antenna array at the base station or the access point (AP). Complex transmit pre-coding weights may be calculated by the AP based on channel state information (CSI) received from each of the stations.

Since the channel varies with time due to station mobility, or mode stirring by objects moving in the environment, the CSI should be updated periodically in order for the AP to beamform accurately to each station. The required rate of CSI feedback for each station may depend on the coherence time of the channel between the AP and that station. An insufficient feedback rate may adversely impact performance due to inaccurate beamforming. On the other hand, an excessive feedback rate may produce minimal additional benefit, while wasting valuable medium time.

In a scenario consisting of multiple spatially separated stations, it may be expected that the channel coherence time, and therefore the appropriate CSI feedback rate, varies spatially across the stations. In addition, due to various factors, such as changing channel conditions and mobility of the stations, the appropriate CSI feedback rate may also vary temporally for each of the stations.

For example, some stations such as a high definition television (HDTV) or a set-top box are stationary, whereas other stations such as handheld devices are subject to motion. Furthermore, a subset of stations may be subject to high Doppler from fluorescent light effects. Finally, multi-paths to some stations may have more Doppler than others since different scatterers may move at different velocities and affect different subsets of stations.

Therefore, if a single rate of CSI feedback is used for all the stations, system performance may suffer due to inaccurate beamforming for stations with insufficient feedback rates and/or excessive feedback overhead for stations with unnecessarily high feedback rates.

In conventional schemes, the CSI feedback may occur at a rate consistent with the worst-case user in terms of mobility or temporal channel variation. However, for an SDMA system consisting of stations that experience a range of channel conditions, a single CSI feedback rate may not be appropriate for all the stations. Catering to the worst-case station may result in an unnecessary waste of channel resources by forcing stations in relatively static channel conditions to feedback CSI values at the same rate as those in highly dynamic channels.

For example, in the CDMA2000 standard, in evolution-data optimized (EV-DO) data rate control channel (DRC), the channel state information reflects the signal to interference plus noise ratio (SINR) of the received pilot. In addition, the channel state information is sent by the station to facilitate rate selection for the next transmission. This information is updated at a fixed rate for all of the stations, presumably at a rate sufficient to track channel variations associated with the worst-case expected mobility situations. It is likely that this rate of channel state feedback is unnecessarily high for static users. It should be noted that the DRC was designed to provide minimal overhead. Because CSI in an SDMA system is used to support complex beamforming at the AP, it may not be feasible to compress or streamline the CSI feedback to the degree accomplished in the EV-DO design.

As a second example, the IEEE 802.11n standard, which supports transmit beamforming, does not specify a rate at which CSI feedback should be sent. Therefore, the CSI feedback rate may be considered an implementation factor. In contrast, due to the potentially high overhead of CSI feedback for multiple SDMA users in the IEEE 802.11ac standard, and the potential for abuse of such CSI feedback mechanism by rogue stations, it may be necessary to specify these protocols in the standard specification.

As described above, an appropriate rate of CSI feedback for a particular station may depend on signal to noise ratio (SNR) conditions of the station. For certain aspects, users with lower SNR values (and hence lower downlink modulation and coding scheme (MCS) levels) may be biased toward a lower CSI feedback rate. Because throughput penalty due to precoding based on staled CSI may be smaller for low MCS/SNR users than the penalty for high MCS/SNR users.

In addition, uplink resources required to communicate CSI are greater for low MCS (i.e., low data rate) users than stations in high SNR conditions. Therefore, it may also be desirable to exclude low-SNR users from downlink multi user (MU)-MIMO completely.

Certain aspects of the present disclosure propose a medium access control (MAC) layer protocol to allow user-dependent and time-dependent CSI feedback transmissions, so that each station in a multi-user MIMO system sends CSI at a rate appropriate to its channel conditions. In many scenarios, this protocol may lead to substantial improvements in network throughput and channel efficiency.

Figure 4:
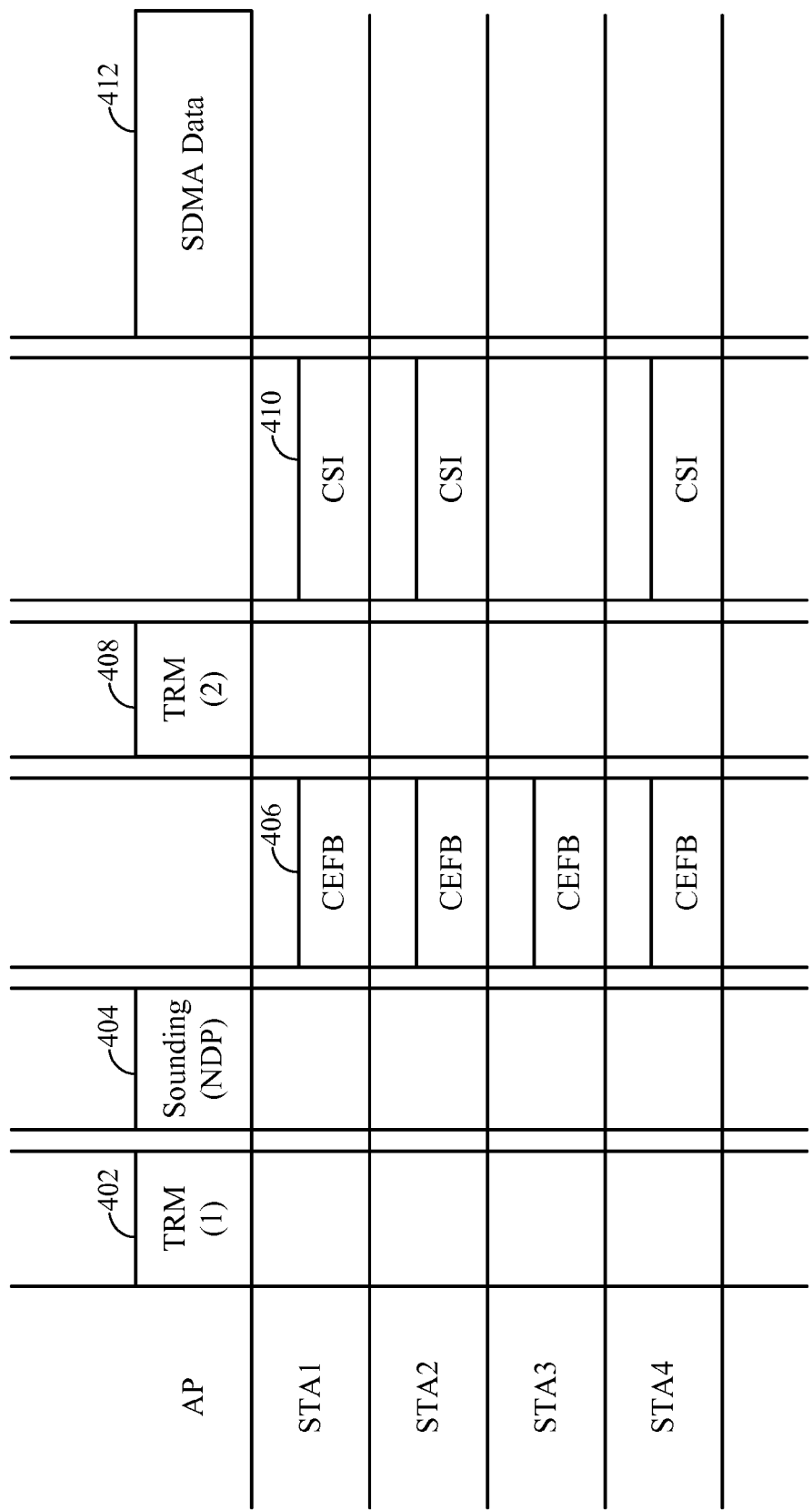
FIG. 4 illustrates a two-step medium access control (MAC) protocol for heterogeneous channel state information (CSI) feedback, in accordance with certain aspects of the present disclosure.

FIG. 4 illustrates a two-step MAC protocol for heterogeneous CSI feedback, in accordance with certain aspects of the present disclosure. In the first step, the access point may request channel evolution feedback (CEFB, 406) from one or more stations. In the second step, the AP may request CSI feedback 410 from a subset of stations. The AP may decide to request feedback from a subset of stations based on the degree of channel evolution of each station, SNR or MCS values of each station, and the overall expected interference level in the next SDMA transmission. The proposed method allows minimization of feedback overhead by exploiting uplink SDMA.

For certain aspects, the transaction illustrated in FIG. 4 may be initiated by the AP using a training request message (TRM) 402. The TRM message may be sent using the lowest supported rate with a format decodable by legacy IEEE 802.11a/g stations and may serve two purposes. First, requesting channel evolution data from all users or a subset of users, such as candidates for an impending downlink SDMA transmission. Second, protecting the channel evolution feedback transaction by setting the duration field of the TRM message to cause all non-participating stations to set their network allocation vector (NAV) appropriately.

The payload of the TRM message may contain bits to indicate the request for channel evolution (i.e., channel state information request). Following a short inter-frame space (SIFS) interval, the AP may send a Null Data Packet (NDP) 404 containing a very high throughput (VHT) preamble to the stations, which may be used for downlink channel sounding. Unlike the TRM, the NDP message (i.e., the channel sounding message) may not be decodable by the legacy stations. Each station may respond to the combination of the TRM and NDP messages with a CEFB message 406, which may contain a metric or metrics indicating degree of channel aging since the most recent CSI was sent.

Based on the metrics received from each station, as well as other network status such as the total number of SDMA stations and the MCS and transmit power for each station, the AP may send a second TRM message 408, requesting channel feedback from a subset of stations from whom the AP has determined CSI feedback is required. This TRM message may also specify the MCS at which each station shall send its CSI feedback value. Stations may then respond with their CSI feedback values. The duration field of the second TRM message 408 may be set to protect the entire duration of CSI feedback transaction from interference from non-participating stations, including legacy stations.

After updating its precoding weights based on the received CSI feedback, the AP may transmit downlink SDMA data 412 to the stations. For certain aspects, the downlink SDMA data transmission may be protected by preceding it with a clear to send (CTS)-to-Self message. In addition, the CTS message may also be protected by the duration field in the second TRM message 408.

If a standard supports uplink SDMA (UL-SDMA), simultaneous transmission of CEFB or CSI messages utilizing UL-SDMA from all the stations may be the most efficient implementation of the protocol illustrated in FIG. 4. In the absence of UL-SDMA, CEFB and CSI messages may be transmitted serially by time division multiple access (TDMA) or orthogonal frequency division multiple access (OFDMA).

Figure 5:
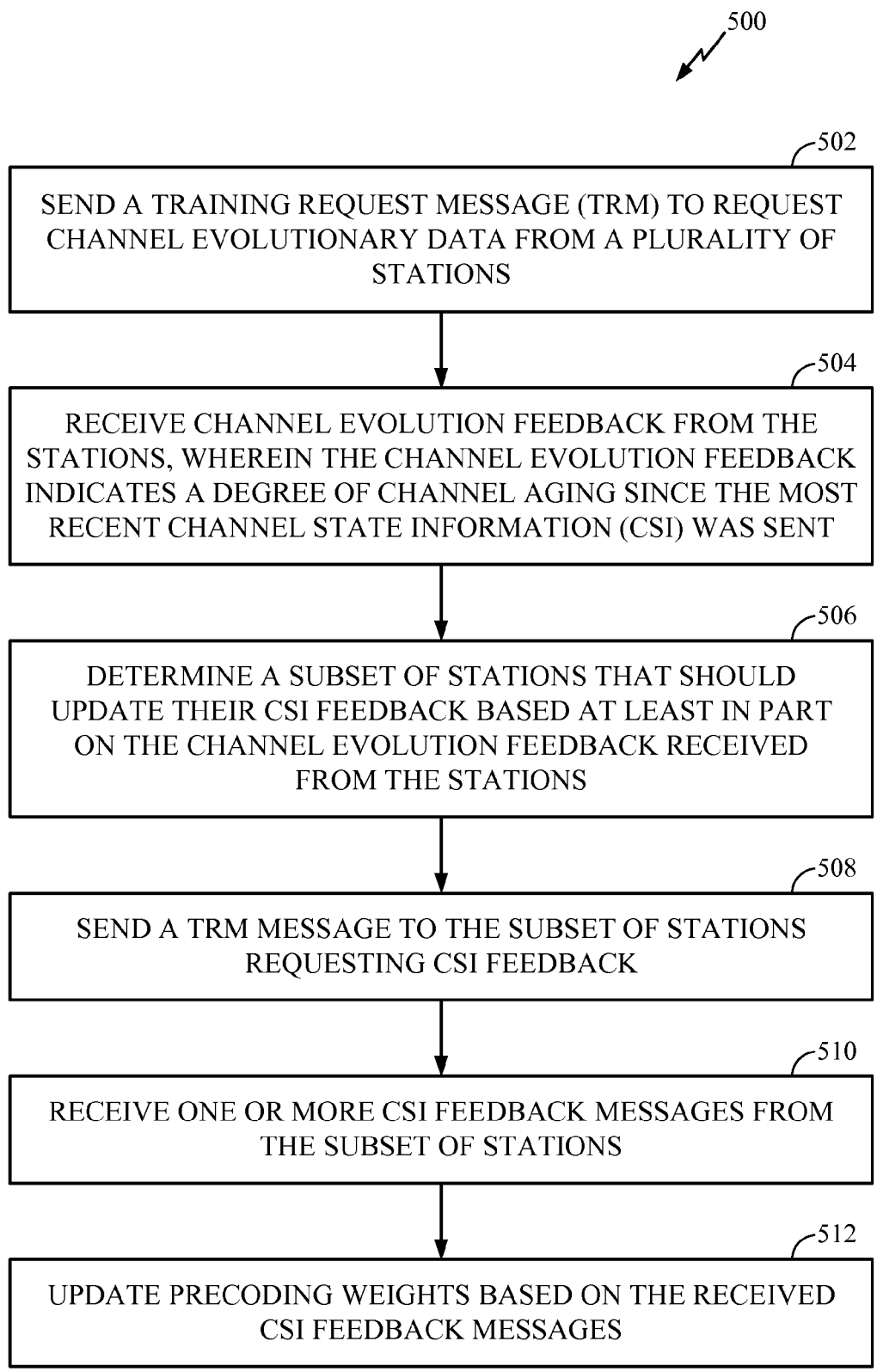
FIG. 5 illustrates example operations that may be performed by an access point for a two-step MAC protocol for heterogeneous CSI feedback, in accordance with certain aspects of the present disclosure.
Figure 5A:
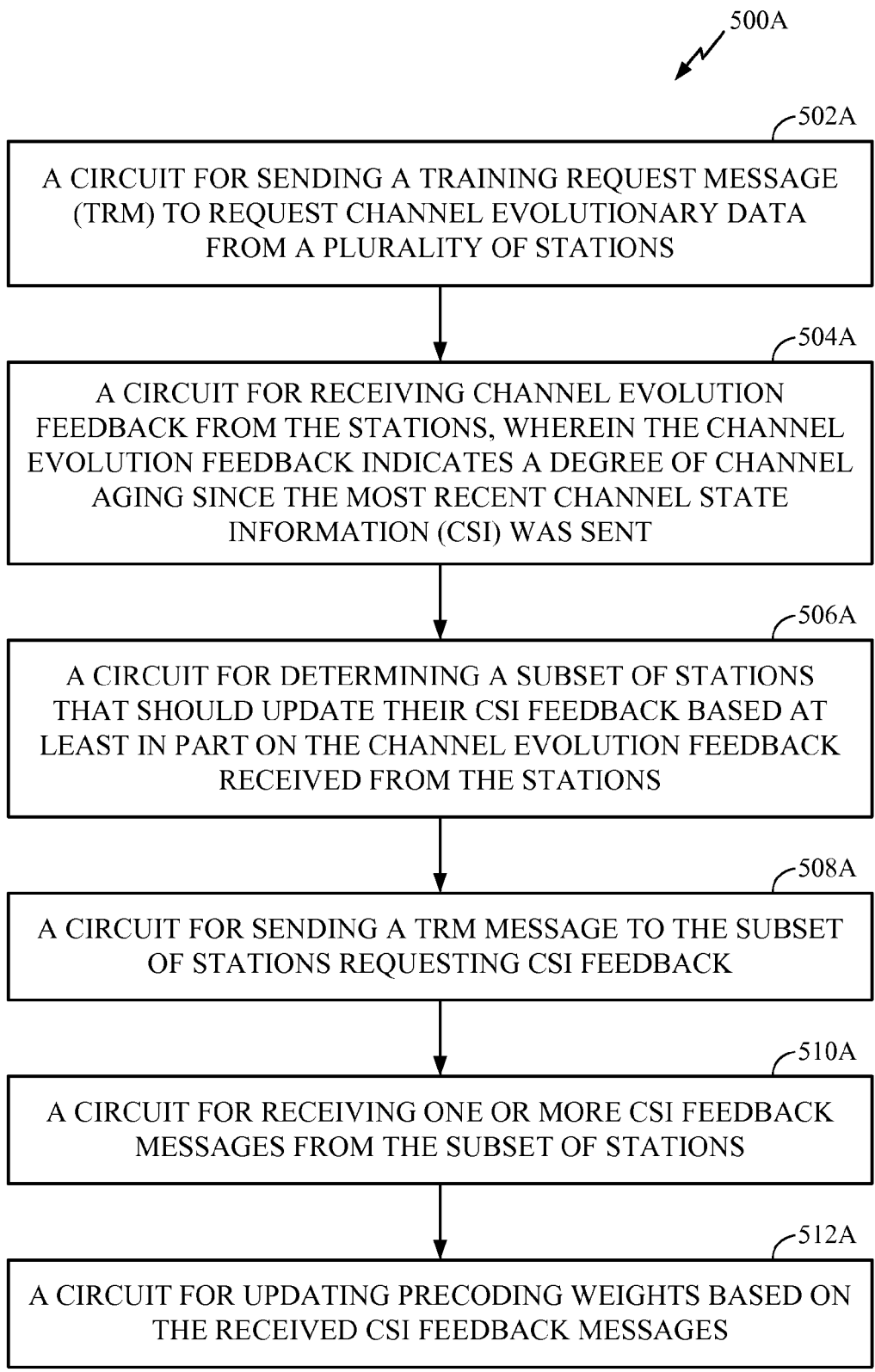
FIG. 5A illustrates example components capable of performing the operations shown in FIG. 5.

FIG. 5 illustrates example operations 500 that may be performed by an access point for a two-step MAC protocol for heterogeneous CSI feedback, in accordance with certain aspects of the present disclosure. At 502, the access point may send a TRM to request channel evolutionary data from a plurality of stations. At 504, the access point may receive channel evolution feedback from the stations, wherein the channel evolution feedback may indicate degree of channel aging since the most recent CSI was sent.

At 506, the access point may determine a subset of stations that should update their CSI feedback based at least in part on the channel evolution feedback received from the stations. At 508, the access point may send a TRM message to the subset of stations requesting CSI feedback. At 510, the access point may receive one or more CSI feedback messages from the subset of stations. At 512, the access point may update precoding weights based on the received CSI feedback messages.

Figure 6:
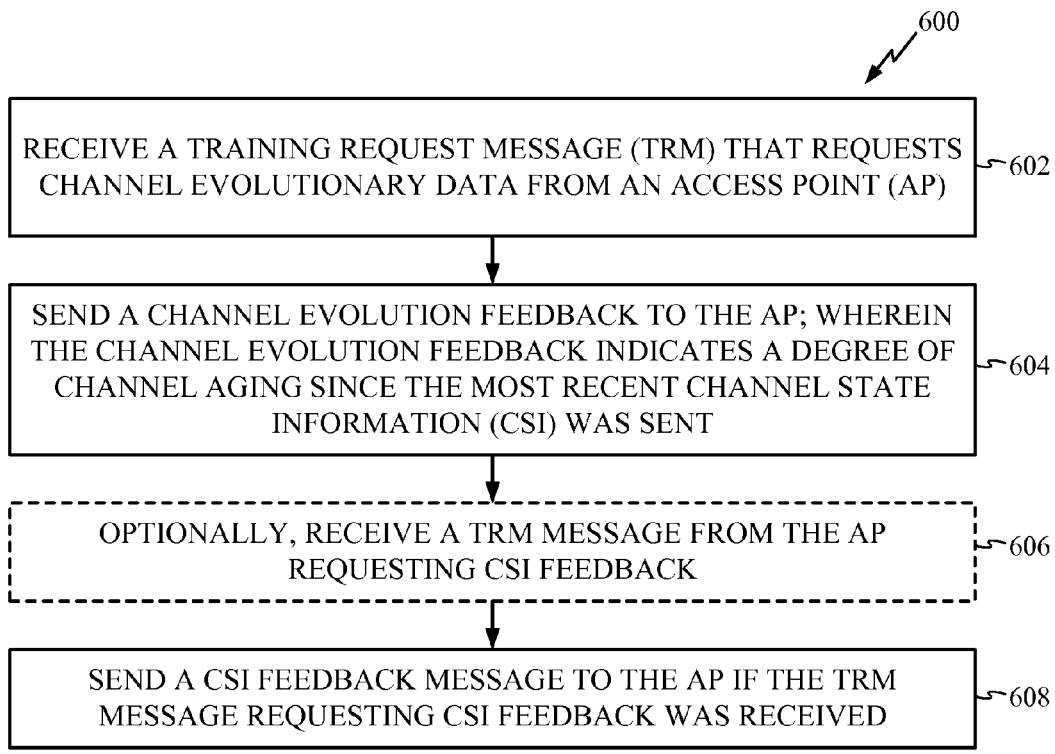
FIG. 6 illustrates example operations that may be performed by a station for a two-step MAC protocol for heterogeneous CSI feedback, in accordance with certain aspects of the present disclosure.
Figure 6A:
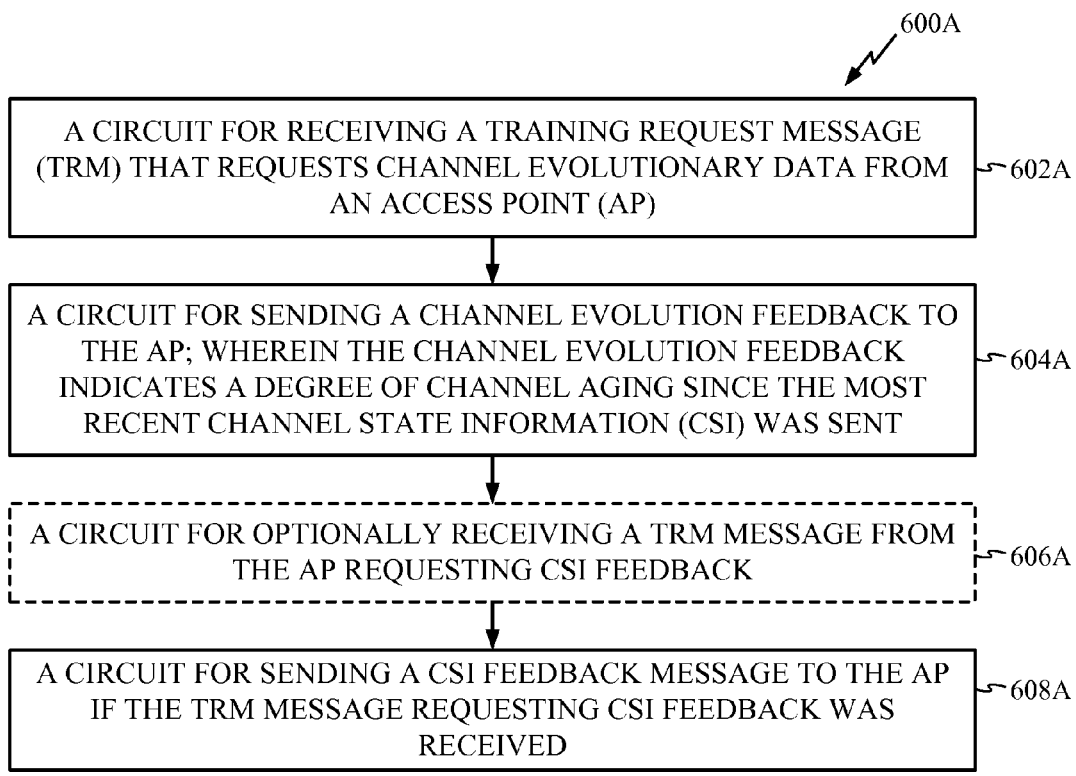
FIG. 6A illustrates example components capable of performing the operations shown in FIG. 6.

FIG. 6 illustrates example operations 600 that may be performed by a station for a two-step MAC protocol for heterogeneous CSI feedback, in accordance with certain aspects of the present disclosure. At 602, the station may receive a TRM message that requests channel evolutionary data from an AP. At 604, the station may send a channel evolution feedback to the AP. The channel evolution feedback may indicate degree of channel aging since the most recent CSI was sent. At 606, the station may receive a TRM message from the AP requesting CSI feedback, if the station is selected by the AP as one of the stations that need to resend CSI information. At 608, the station may send a CSI feedback message to the AP if the TRM message requesting CSI feedback was received.

For certain aspects, if CSI feedback is not accomplished by UL-SDMA, the duration field contained in the second TRM message may be calculated by the AP assuming that all the stations will send CSI feedback. In general, this mechanism may protect the CEFB and CSI messages from collisions occurring due to transmissions from the stations not participating in feedback transmissions.

For certain aspects, a 'soft' channel evolution metric may be used that centralizes the decision to request CSI at the AP. The AP may also consider other factors such as the multi-user interference level and per-user MCS in the decision.

Figure 7:
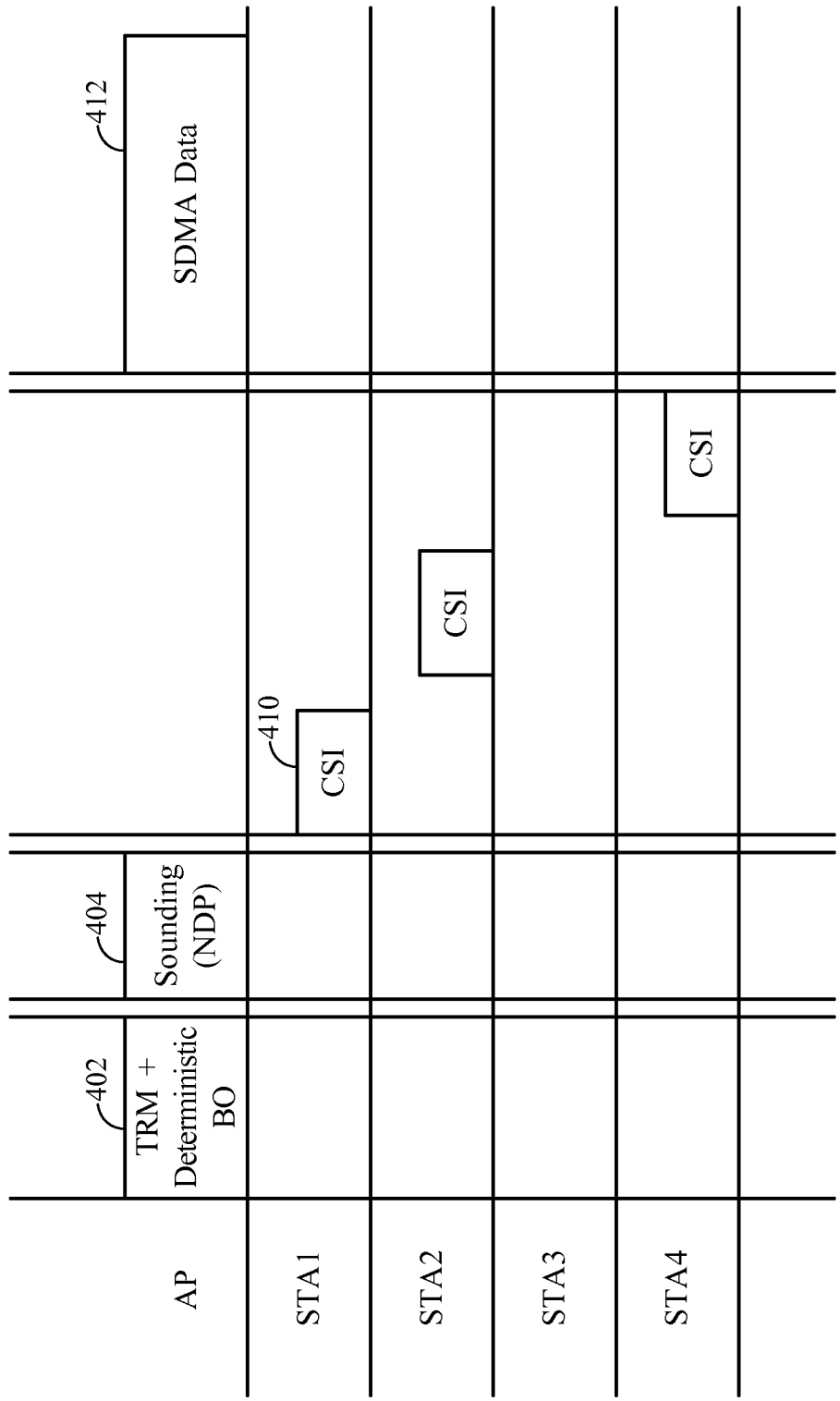
FIG. 7 illustrates a MAC protocol for heterogeneous CSI feedback based on deterministic back-off timers, in accordance with certain aspects of the present disclosure.

FIG. 7 illustrates an alternative MAC protocol for heterogeneous CSI feedback based on deterministic back-off timers, in accordance with certain aspects of the present disclosure. As illustrated, the decision to send a CSI feedback message may be performed in a single step. In addition, each of the stations may decide whether or not to transmit a CSI feedback. The decision may be based, at least in part, on defined metric and predetermined criteria. Only the stations which determine that the channel has changed since the last time a CSI feedback message was sent may transmit CSI feedback. As a result, the CSI feedback overhead may be reduced.

The protocol illustrated in FIG. 7 may be more appropriate for air interfaces in which UL-SDMA is not available. In the proposed protocol, each SDMA station may decide weather or not to feed back CSI based on an internal calculation akin to a hard metric. Timing of the serial CSI transmissions may be accomplished by exploiting a deterministic backoff timer.

The AP may initiate the transactions in FIG. 7 by sending a TRM message addressed to those stations intended for a pending DL-SDMA transmission. The TRM message may contain a deterministic backoff assignment for each station. Similar to FIG. 4, the TRM message may be followed by an NDP message providing a sounding preamble. Each station may respond in turn with CSI feedback if the station decides a CSI update is needed at the AP. If a station decides CSI update is not required, the station may not transmit anything.

Utilizing a deterministic back-off timer, each station transmits only when its backoff timer expires. Each station may also pause its timer when it detects transmission by other stations. Timers may resume counting down after the other station completes its transmission and vacates the medium. With appropriately selected backoff values, the time lost due to non-responding stations may be minimized, which may help reduce the time required to receive all the required CSI feedback messages.

Following the reception of a CSI message from the last station, or the expiration of the longest backoff timer, the AP may recalculate precoding weights and may start DL-SDMA transmission 412. In the example illustrated in FIG. 7, STA3 does not transmit a CSI feedback message, and STA4 begins transmitting a CSI feedback message after a minimal delay.

For certain aspects of the present disclosure, the request message may provide an indication that the CSI is to be sent using a sounding frame or a data frame.

Figure 8:
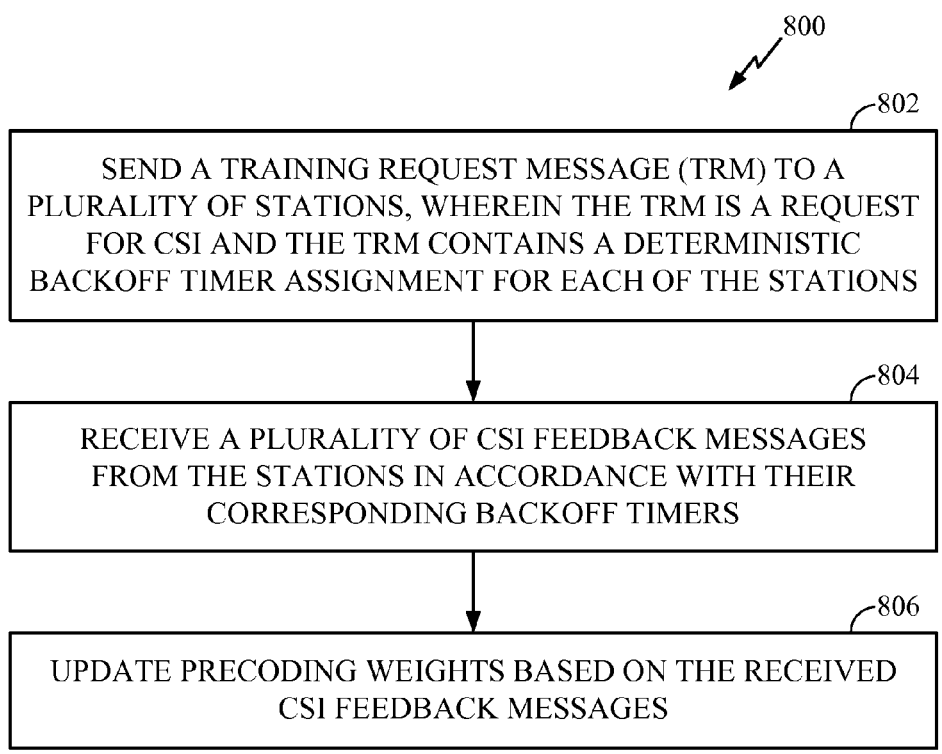
FIG. 8 illustrates example operations that may be performed by an access point for a MAC protocol for heterogeneous CSI feedback based on deterministic back-off timers, in accordance with certain aspects of the present disclosure.
Figure 8A:
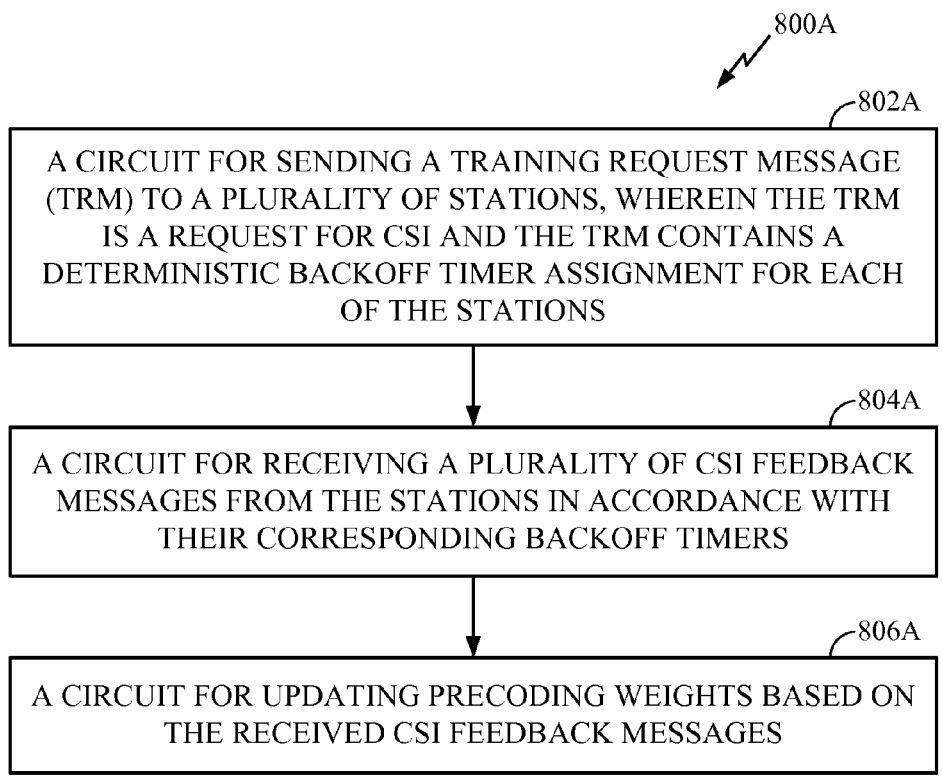
FIG. 8A illustrates example components capable of performing the operations shown in FIG. 8.

FIG. 8 illustrates example operations 800 that may be performed by an access point for a MAC protocol for heterogeneous CSI feedback based on deterministic back-off timers, in accordance with certain aspects of the present disclosure. At 802, the access point sends a TRM message to a plurality of stations. The TRM is a request for CSI and the TRM message contains a deterministic backoff timer assignment for each of the stations. At 804, the access point receives a plurality of CSI feedback messages from the stations in accordance with their corresponding backoff timers. At 806, the access point updates precoding weights based on the received CSI feedback messages.

Figure 9:
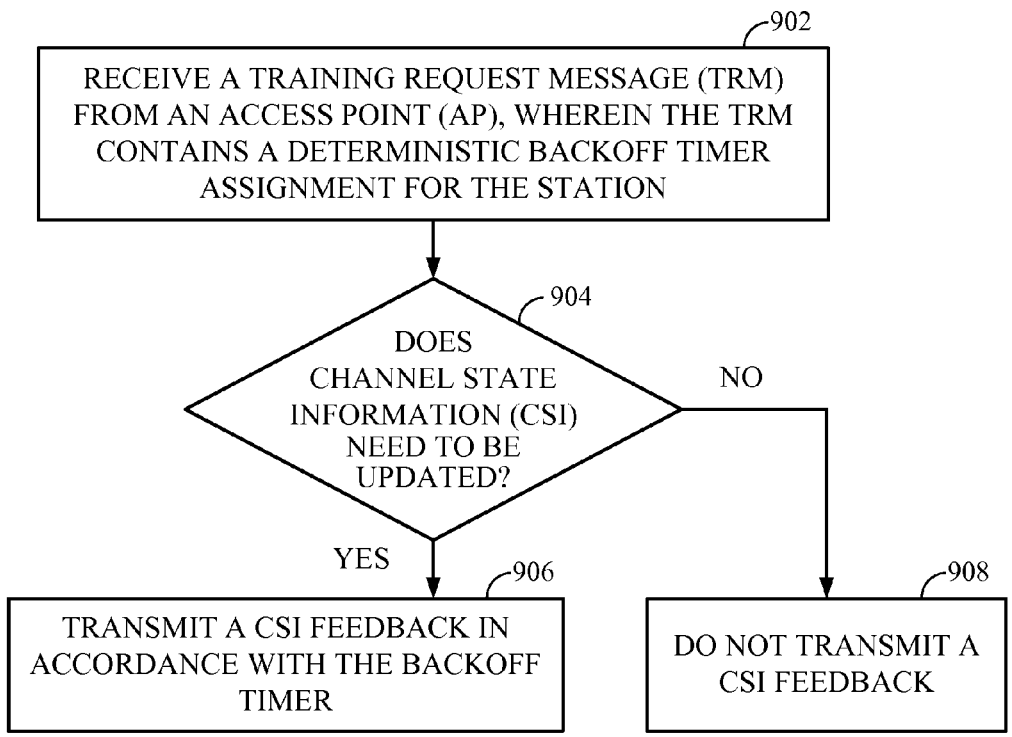
FIG. 9 illustrates example operations that may be performed by a station for a MAC protocol for heterogeneous CSI feedback based on deterministic back-off timers, in accordance with certain aspects of the present disclosure.
Figure 9A:
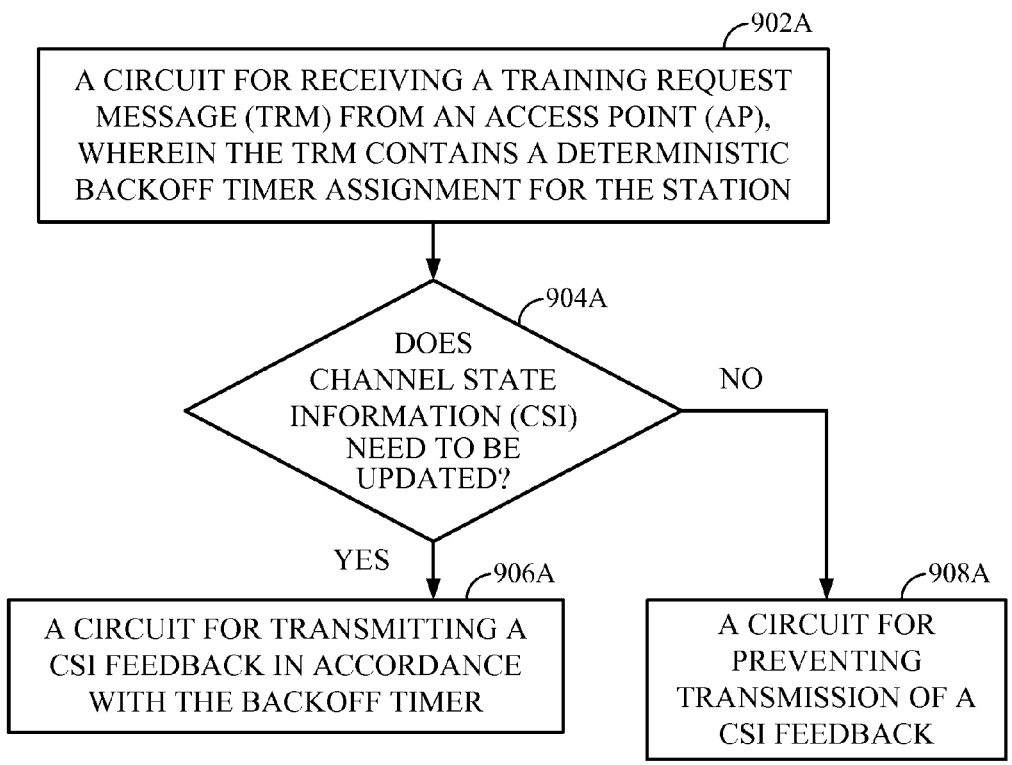
FIG. 9A illustrates example components capable of performing the operations shown in FIG. 9.

FIG. 9 illustrates example operations 900 that may be performed by a station for a MAC protocol for heterogeneous CSI feedback based on deterministic back-off timers, in accordance with certain aspects of the present disclosure. At 902, the station receives a TRM from an AP, wherein the TRM contains a deterministic backoff timer assignment for the station. At 904, the station determines if CSI needs to be updated. If yes, at 906, the station transmits a CSI feedback in accordance with the backoff timer. If the CSI does not need to be updated, at 908, the station does not transmit a CSI feedback.

One disadvantage of this protocol is that the deterministic backoff concept assumes all the stations can detect the transmissions of the other stations by sensing the medium. However, in the presence of hidden nodes, backoff timers may not pause as expected, potentially leading to collisions of CSI feedback data.

Figure 10:
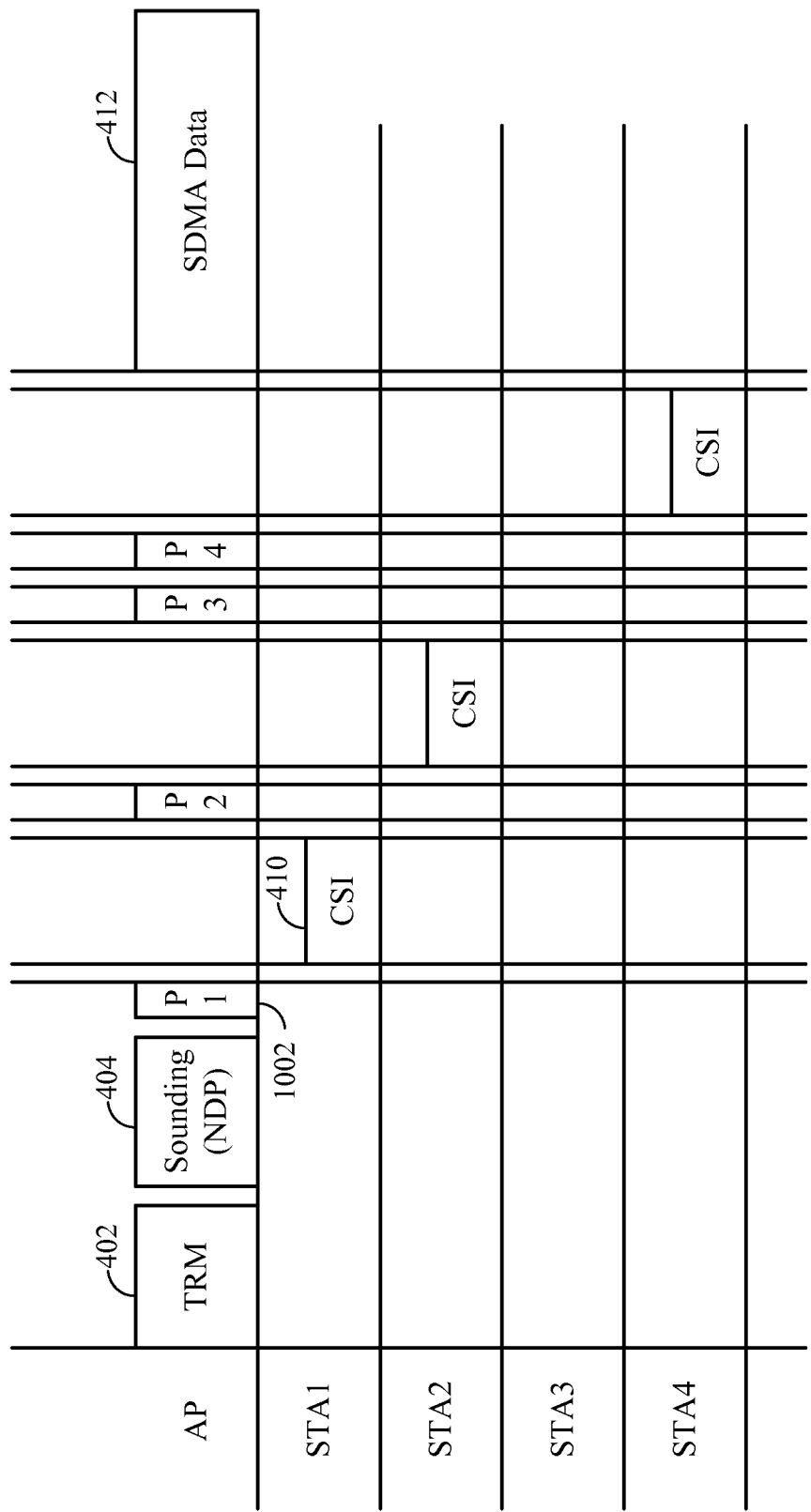
FIG. 10 illustrates a MAC protocol for heterogeneous CSI feedback based on polling of stations, in accordance with certain aspects of the present disclosure.

FIG. 10 illustrates a MAC protocol for heterogeneous CSI feedback based on polling of stations, in accordance with certain aspects of the present disclosure. This protocol avoids the hidden node problem and hence avoids collision of the transmissions from different stations by utilizing a polling protocol.

As illustrated in FIG. 10, following transmission of the TRM and sounding NDP messages, each station is polled sequentially for CSI feedback. A station may respond to polling 1002 by transmitting CSI feedback if the station determines that a CSI update is required. Otherwise, the station may transmit nothing. If the AP does not detect a response to a poll after one timeslot, the AP polls the next station. Following the reception of CSI from the last station, or no response from the final polled station, the AP may recalculate the precoding weights and may begin DL-SDMA data transmission. In the example illustrated in FIG. 10, STA3 does not transmit a CSI feedback message. When the AP does not detect a response from STA3 in a certain time, it may poll STA4 for CSI feedback.

Figure 11:
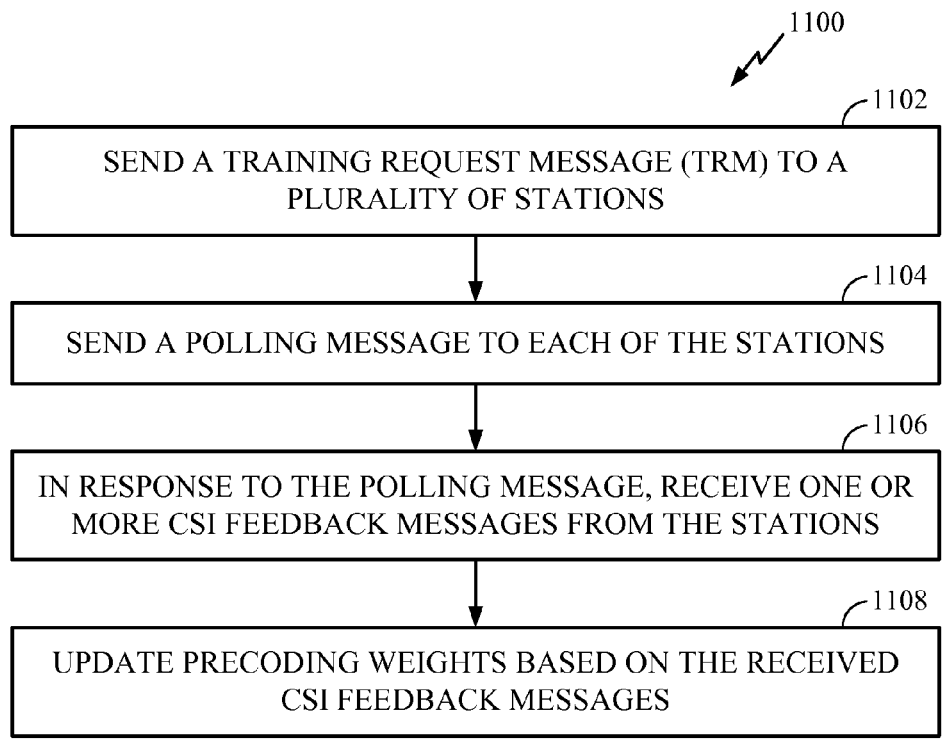
FIG. 11 illustrates example operations that may be performed by an access point for a MAC protocol for heterogeneous CSI feedback based on polling of stations, in accordance with certain aspects of the present disclosure.
Figure 11A:
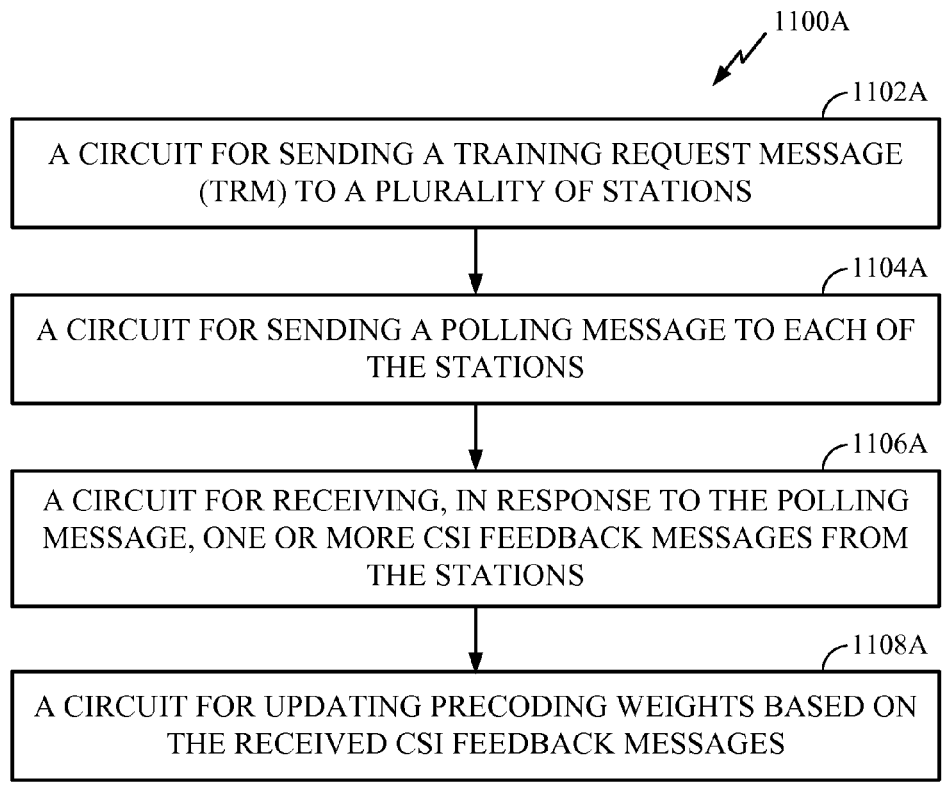
FIG. 11A illustrates example components capable of performing the operations shown in FIG. 11.

FIG. 11 illustrates example operations 1100 that may be performed by an access point for a MAC protocol for heterogeneous CSI feedback based on polling of stations, in accordance with certain aspects of the present disclosure. At 1102, the access point sends a TRM message to a plurality of stations. At 1104, the access point sends a polling message to each of the stations. At 1106, the access point in response to the polling message, receives one or more CSI feedback messages from the stations. At 1102, the access point updates precoding weights based on the received CSI feedback messages.

Figure 12:
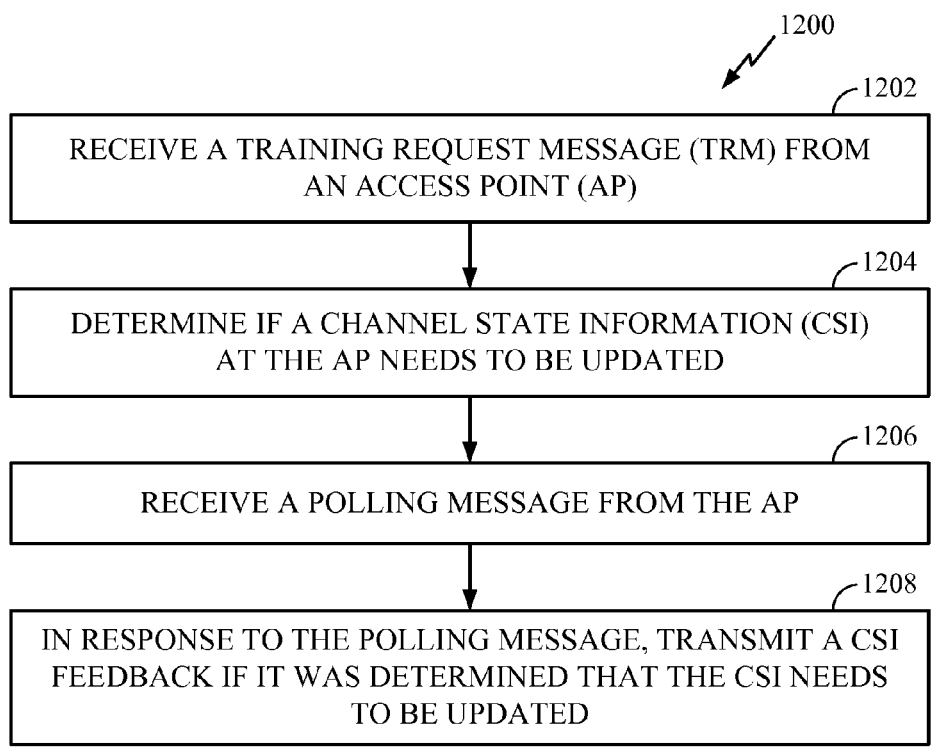
FIG. 12 illustrates example operations that may be performed by a station for a MAC protocol for heterogeneous CSI feedback based on polling of stations, in accordance with certain aspects of the present disclosure.
Figure 12A:
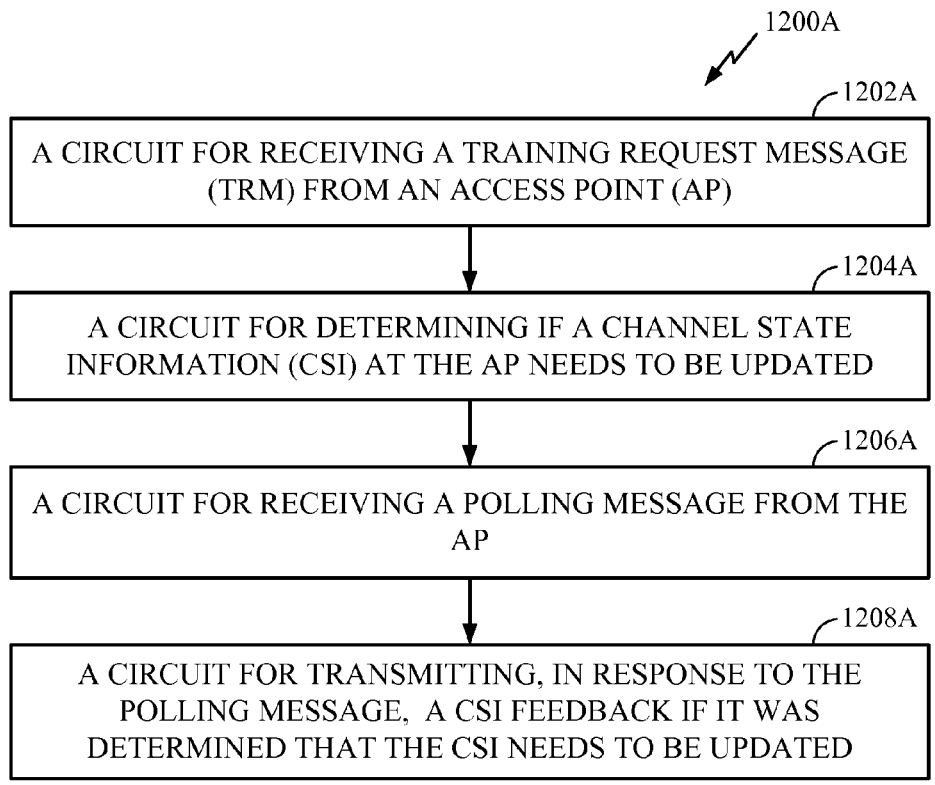
FIG. 12A illustrates example components capable of performing the operations shown in FIG. 12.

FIG. 12 illustrates example operations 1200 that may be performed by a station for a MAC protocol for heterogeneous CSI feedback based on polling of stations, in accordance with certain aspects of the present disclosure. At 1202, the station receives a TRM message from an AP. At 1204, the station determines if a CSI at the AP needs to be updated. At 1206, the station receives a polling message from the AP. At 1208, in response to the polling message, the station transmits a CSI feedback if it was determined that the CSI needs to be updated, otherwise, the station does not transmit anything.

For certain aspects of the present disclosure, the TRM message may have a legacy decodable format. Therefore, the TRM message may be decoded by all the stations, even those stations that do not support DL-SDMA (i.e., legacy stations). The TRM message may carry a duration field so that some of the stations defer their transmissions by setting their NAV appropriately. The stations who defer their transmissions may be the stations that are not taking part in the upcoming DL SDMA transmission or stations (even legacy stations) who are not SDMA capable.

For certain aspects, the duration field contained in the TRM message may be calculated by the AP assuming that all of the stations may feedback CSI messages. This protects the sounding NDP and CSI messages from collisions occurring due to transmissions of stations not participating in feedback transmissions.

The present disclosure proposed protocols to reduce the CSI feedback overhead when uplink SDMA is supported. Certain aspects optimize feedback overhead when UL-SDMA is not supported. As described in the document, the channel evolution and CSI feedback may be protected from data collisions by informing the legacy stations or other stations that are not participating in any specific SDMA transmission about the upcoming feedback transmissions.

Analysis

Expanding on the scenarios described in this disclosure document, a 40 MHz 802.11ac network is assumed with an 8-antenna AP and 10 dual-antenna stations experiencing a range of channel coherence times, such as 100 ms, 200 ms, 400 ms, 400 ms, 600 ms, 800 ms, 1000 ms and 1200 ms. These values are consistent with recent measurement campaigns involving stationary stations in indoor conditions with deliberate pedestrian activity in the channel (100 ms represents approximately the one percentile of the measurements). It is assumed that a preferred CSI feedback interval for a given station is 10% of its channel coherence time. In addition, a nominal uplink capacity of 54 Mbps may be assumed for all the stations.

If the proposed protocol is not implemented, the system must be designed so that all stations send CSI feedback at a rate suitable for the expected worst-case Doppler condition. Assuming 100 ms coherence time, all users may therefore feedback CSI messages 100 times per second. Therefore, total capacity required for all CSI feedback messages may be written as:

100 CSI/sec×16 bit/CSI×8$Tx$×2$Rx$×114 subcarriers× 10 stations×110% MAC overhead=30.6 Mbps, which represents ~57% of the available 54 Mbps uplink capacity.

If the proposed protocol is implemented, CSI feedback may occur at a rate appropriate for channel coherence time of each station. In this case, total throughput required for transmitting all the CSI feedback messages is 8.3 Mbps, which represents approximately 15% of the available 54 Mbps uplink capacity. This represents a 73% reduction in the channel overhead required for explicit CSI feedback compared to the case where the proposed techniques are not implemented.

In conditions where stations are subject to a range of SNRs or SINRs, further optimization may be possible by applying lower feedback rates to low MCS users, resulting in additional overhead reduction.

CSI Evolution Metric

For certain aspects of the present disclosure, in a MAC-layer protocol for adaptive station-dependent channel state information feedback rate, a channel state information evolution metric may be calculated by either an access point or a station. The CSI evolution metric may be utilized by either the AP or the station to assess the degree of CSI "aging" or "evolution" for the station. The CSI evolution metric may be calculated at the station and fed back to the access point for further processing. Or, the CSI evolution metric may be calculated at the AP using two of the most recent CSI values received from a station.

The CSI evolution metric may account for both the degree of CSI evolution for each station, and the SNR conditions of the station. In order to prevent "rogue" stations from unfairly exploiting the protocol by communicating an artificial metric which may encourage an unnecessarily high CSI feedback rate, a CSI evolution metric may need to be defined in the air interface standard specification, rather than being left up to the implementer.

For certain aspects, the CSI evolution metric may be defined as a "soft metric," which is calculated by a station and communicated to an AP or directly calculated by the AP. In this case, the AP may be responsible for the decision as to whether or not a CSI update is required from the station. The CSI evolution metric, $D_{CSI}$, may be calculated as follows:

$$D_{CSI} = \frac{\|H_{old} - H_{new}\|^2}{\|H_{old}\|\|H_{new}\|} \quad (1)$$

$$\frac{\|H_{old} - H_{new}\|^2}{\|H_{old}\|\|H_{new}\|}$$

where $\|H\| \|H\|$ denotes norm of matrix H, $H_{new}$ is the latest downlink complex channel estimate measured at the station. $H_{old}$ is the complex channel estimate most recently fed back to the AP, based on which current precoding weights are calculated. The value of $D_{CSI}$ may approach zero when $H_{old}$ and $H_{new}$ are similar. The value of $D_{CSI}$ may become larger as either magnitude or phase characteristics of $H_{new}$ deviate from the magnitude or phase characteristics of $H_{old}$. Note that $H_{new}$ and $H_{old}$ in this document refer to pilot-adjusted channel estimations to correct for the effects of phase noise in the receiver.

For certain aspects of the present disclosure, the CSI evolution metric, $D_{CSI}$, may be sent to the AP accompanied by an indication of the current SNR conditions of the station. The AP may decide whether or not to request CSI feedback from the station based at least in part on the information received from the station. The indication of the current SNR conditions of the station may be an explicit SNR estimate. The current SNR conditions may also be ascertained implicitly from the current downlink and/or uplink MCS for that station.

For certain aspects, the AP may also consider number of stations expected in the next SDMA transmission, and the downlink transmit power assigned to each station to decide whether or not to request CSI feedback from stations.

In a high SNR regime, SINR of a user decreases as its channel evolves because nulls of the interfering users are no longer optimally steered, resulting in higher interference to that user. Therefore, as the number of stations served by an access point through SDMA increases (assuming equidistant users), potential for interference is also increased. As a result, the SINR and achievable data rate of the user become increasingly sensitive to channel evolution.

Consequently, for certain aspects, the AP may request CSI more frequently when number of SDMA stations is large. Similarly, if high power is transmitted to some users, more frequent feedback may be required from some of the stations, due to higher potential for interference.

For certain aspects, in an OFDM system, the CSI evolution metric, $D_{CSI}$, may be calculated for all of the subcarriers or a subset of the subcarriers. The channel evolution feedback provided to the AP may take the form of separate metrics for each subcarrier or an average across all subcarriers. The average channel evolution metric may require less uplink channel resources to be communicated, and may also be a more reliable estimate of the degree of channel evolution.

For certain aspects, for a station with multiple antennas, the $D_{CSI}$ may be calculated separately for each receive antenna. $H_{old}$ and $H_{new}$ may also take the form of a full $N_{rx} \times N_{tx}$ channel estimate. Therefore, the channel evolution feedback provided to the AP may either be separate metrics for each receive antenna, or an average across all antennas.

For certain aspects of the present disclosure, the $D_{CSI}$ may be defined as a "hard metric," that may be calculated by the station and communicated to the AP. In this case, the station may be responsible for the decision as to whether or not a CSI update to the AP is required. The hard $D_{CSI}$ metric may be written as a logical value (i.e., true or false) and may be specified as follows:

$$\frac{\|H_{old} - H_{new}\|^2}{\|H_{old}\| - \|H_{new}\|} > \frac{1}{SNR} \times \text{Margin} \tag{2}$$

where the SNR may be the current SNR in linear units experienced by the station, and Margin may be a fixed threshold or margin defined in the system.

Note that the hard $D_{CSI}$ metric in Eqn (2) is generated by comparing the soft $D_{CSI}$ metric described in Eqn (1) with an SNR-dependent threshold. If the channel has evolved sufficiently to warrant an update of CSI to the AP, Eqn (2) will be 'true.' The hard $D_{CSI}$ metric is more likely to be true for high-SNR stations. This is desirable since more frequent feedback is required from stations with high SNR or high MCS.

For certain aspects, a second soft $D_{CSI}$ metric for tracking channel evolution at a station may be defined as follows:

$$D_{CSI} = \left| \frac{H_{old} \cdot H'_{new}}{\|H_{old}\|} \|H_{new}\| \right| \tag{3}$$

where $H_{new}$ and $H_{old}$ are row vectors containing complex channel estimates for a single station antenna, A·B represents the inner product of vectors A and B, B' represents the Hermitian transpose of vector B, and |x| denotes the magnitude of x. The value of the soft $D_{CSI}$ metric in Eqn (3) may be equal to one when $H_{old}$ and $H_{new}$ are similar. $D_{CSI}$ becomes smaller as the phase characteristics of $H_{new}$ deviate from $H_{old}$. It should be noted that, however, channel evolution due to changes in magnitude of H such as changes in path loss may not be detected by this metric.

For certain aspects, a third soft $D_{CSI}$ metric may be defined as follows:

$$D_{CSI} = \left| \arg\left( \frac{H_{old} \cdot H'_{new}}{\|H_{old}\| \|H_{new}\|} \right) \right| \tag{4}$$

where $H_{new}$ and $H_{old}$ are complex channel estimates for a single antenna station, arg(x) represents the argument (i.e., angle) function of x. The value of the soft $D_{CSI}$ metric in Eqn (4) may be equal to zero when $H_{old}$ and $H_{new}$ are similar. $D_{CSI}$ may become larger as the phase characteristics of $H_{new}$ deviate from $H_{old}$. However, it should be noted that channel evolution due to changes in the magnitude of H such as changes in path loss are not well detected by this metric.

Because neither of the soft metrics defined in Eqns (3) and (4) are akin to an SNR, they may not be as suitable for the basis of a hard metric as the soft metric defined in Eqn (1).

For certain aspects, a fourth metric for tracking channel evolution may be defined as follows:

$$D_{CSI} = \frac{1 - \rho^2}{\rho^2} \tag{5}$$

where $$\rho^2 = \left| \frac{H_{old} \cdot H'_{new}}{\|H_{old}\| \|H_{new}\|} \right|, \tag{6}$$

in which $\rho^2$ is equivalent to the metric described in Eqn (3). The metric described in Eqn (5) is a good estimator of the metric described in Eqn (1), and may be used in its place as an estimate of the mean squared error between $H_{old}$ and $H_{new}$.

The metric in Eqn (5) has the advantage of being immune to the impact of phase reference drift between the station and the AP, which does not impact multi-user MIMO performance. In the presence of phase drift, the metric described in Eqn (1) may trigger result in an overestimation of the degree of channel evolution.

Figure 13:
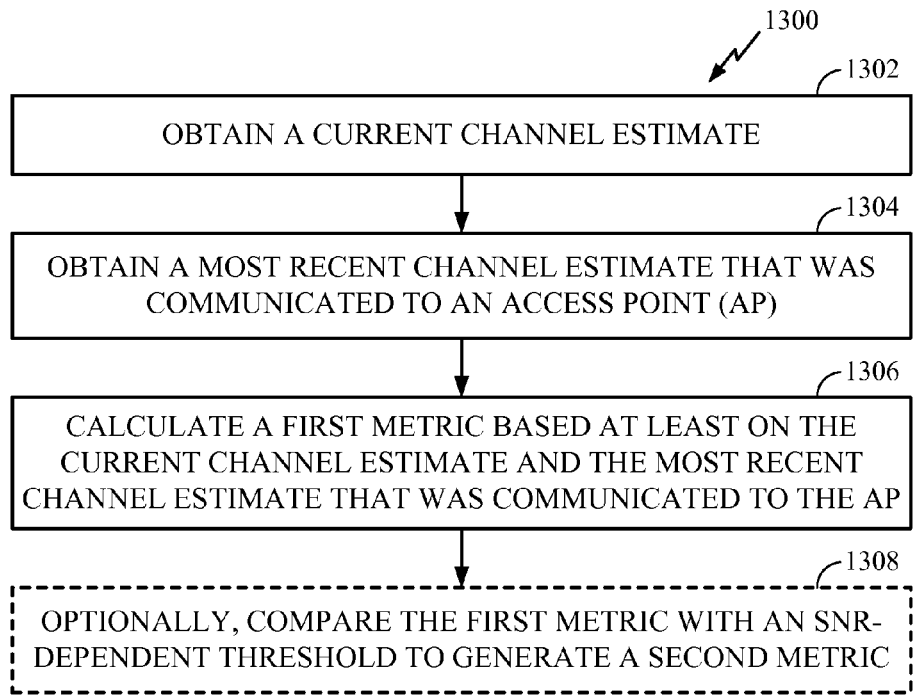
FIG. 13 illustrates example operations for calculating physical layer metrics to support heterogeneous CSI feedback that may be performed by a station, in accordance with certain aspects of the present disclosure.
Figure 13A:
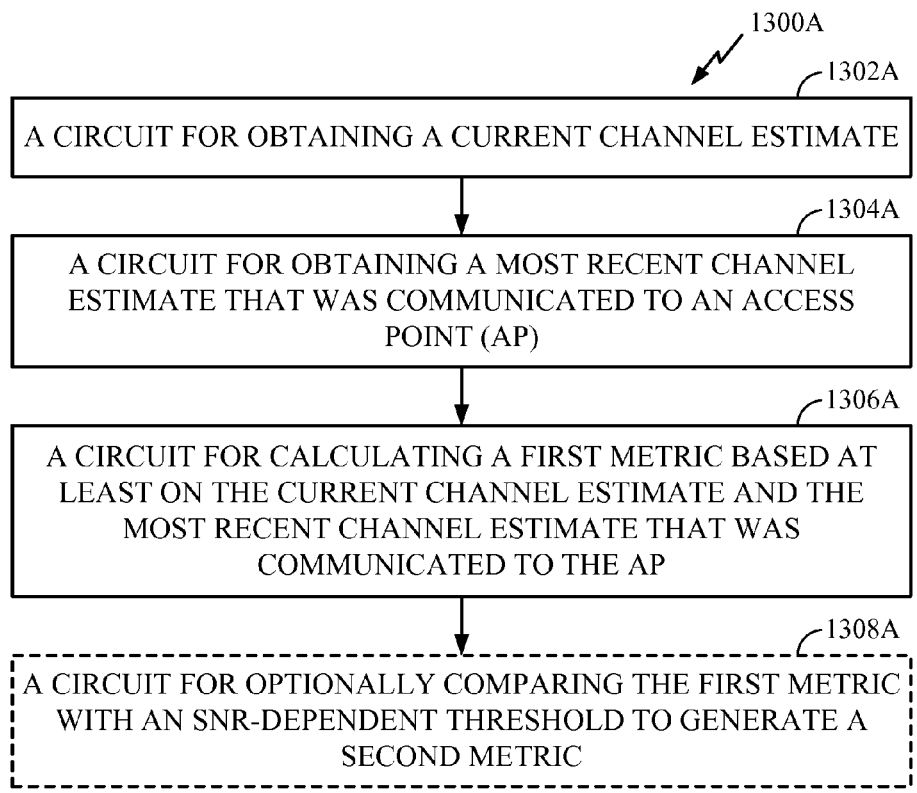
FIG. 13A illustrates example components capable of performing the operations shown in FIG. 13.

FIG. 13 illustrates example operations 1300 for calculating physical layer metrics to support heterogeneous CSI feedback, in accordance with certain aspects of the present disclosure. At 1302, a station obtains a current channel estimate. At 1304, the station obtains a most recent channel estimate that was communicated to an AP. At 1306, the station calculates a first metric (i.e., a soft metric) based at least on the current channel estimate and the most recent channel estimate that was communicated to the AP.

At 1308, the station may compare the first metric with an SNR-dependent threshold to generate a second metric (i.e., a hard metric). The station may transmit the first or the second metrics to the access point, from which the access point decides whether or not it should ask for a CSI update. The station may also use the second metric to decide whether or not it should send a CSI update to the access point.

For certain aspects, the metrics described in equations 1 through 5, may be calculated by the AP. The AP may use the calculated metrics to decide whether or not to request CSI from each STA. Therefore, the metrics described above may be considered part of the decision-making algorithm in the AP, rather than a metric to be tracked and communicated to the AP by the station.

For certain aspects, the decision of whether to request a CSI update from the station may depend on the time elapsed since the last CSI update in addition to the channel evolution metric.

Figure 14:
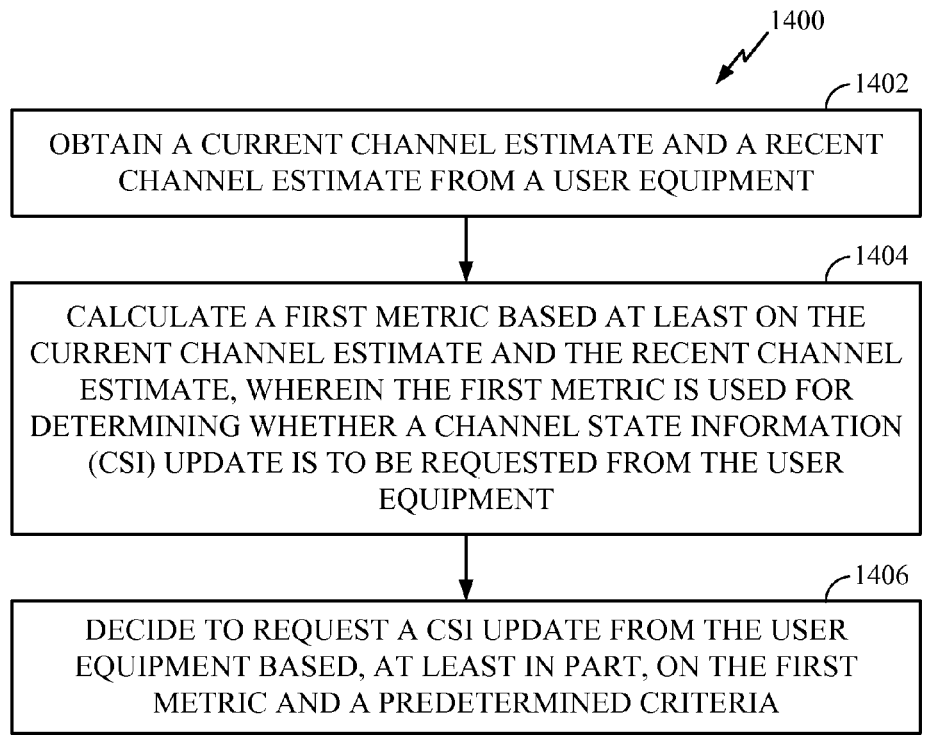
FIG. 14 illustrates example operations for calculating physical layer metrics to support heterogeneous CSI feedback that may be performed by an access point, in accordance with certain aspects of the present disclosure.
Figure 14A:
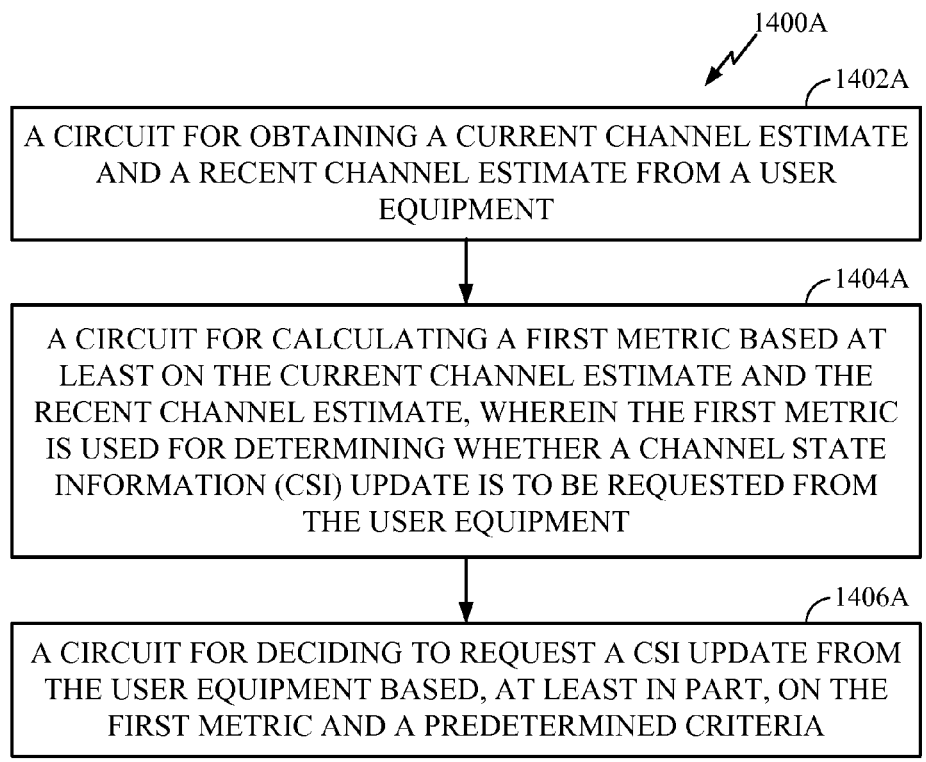
FIG. 14A illustrates example components capable of performing the operations shown in FIG. 14.

FIG. 14 illustrates example operations for calculating physical layer metrics to support heterogeneous CSI feedback that may be performed by an access point, in accordance with certain aspects of the present disclosure.

At 1402, the AP obtains a current channel estimate and a recent channel estimate from a station. At 1404, the AP calculates a first metric based at least on the current channel estimate and the recent channel estimate, wherein the first metric is used for determining whether a channel state information (CSI) update is to be requested from the user equipment.

Aspects of the present disclosure proposed metrics and methods to support adaptive station-dependent channel state information feedback rate in multi-user communication systems. As described earlier, channel evolution metrics may be calculated either by the AP or by the station.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 500 and 600, 800, 900, 1100, 1200, 1300 and 1400 illustrated in FIGS. 5, 6, 8, 9, 11, 12, 13 and 14 respectively correspond to components 500A, 600A, 800A, 900A, 1100A, 1200A, 1300A and 1400A illustrated in FIGS. 5A, 6A, 8A, 9A, 11A, 12A, 13A and 14A respectively.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

While the foregoing is directed to aspects of the disclosure, other and further aspects of the disclosure may be devised without departing from the basic scope thereof, and the scope thereof is determined by the claims that follow.

What is claimed is:

1. A method to support an adaptive user dependent channel state information (CSI) feedback rate in a multi-user wireless communication system, performed by a first apparatus, comprising:

receiving a current channel estimate;

calculating a metric based at least on the current channel estimate and a recent channel estimate communicated to a second apparatus; and
comparing the metric with a threshold for deciding if a CSI update is to be sent to the second apparatus.

2. The method of claim 1, further comprising:
receiving a request message from the second apparatus; and
in response to the request message, transmitting the metric to the second apparatus.

3. The method of claim 1, wherein the second apparatus comprises an access point.

4. The method of claim 1, wherein the threshold is based on a signal to noise ratio (SNR) of a channel used by the first apparatus.

5. The method of claim 4, further comprising:
transmitting the logical value to the second apparatus.

6. An apparatus that supports an adaptive user dependent channel state information (CSI) feedback rate in a multi-user wireless communication system, comprising:
an estimator configured to obtain a current channel estimate;
a circuit configured to calculate a metric based at least on the current channel estimate and a recent channel estimate communicated to another apparatus; and
another circuit configured to compare the metric with a threshold for deciding if a CSI update is to be sent to the other apparatus.

7. The apparatus of claim 6, further comprising:
a receiver configured to receive a request message from the other apparatus; and
a transmitter configured to transmit, in response to the request message, the metric to the other apparatus.

8. The apparatus of claim 6, wherein the other apparatus comprises an access point.

9. The apparatus of claim 6, wherein the threshold is based on a signal to noise ratio (SNR) of a channel used by the apparatus.

10. The apparatus of claim 9, wherein the transmitter is also configured to transmit the logical value to the other apparatus.

11. An apparatus that supports an adaptive user dependent channel state information (CSI) feedback rate in a multi-user wireless communication system, comprising:
means for obtaining a current channel estimate;
means for calculating a metric based at least on the current channel estimate and a recent channel estimate communicated to another apparatus; and
means for comparing the metric with a threshold for deciding if a CSI update is to be sent to the other apparatus.

12. The apparatus of claim 11, further comprising:
means for receiving a request message from the other apparatus; and
means for transmitting, in response to the request message, the metric to the other apparatus.

13. The apparatus of claim 11, wherein the other apparatus comprises an access point.

14. The apparatus of claim 11, wherein the threshold is based on a signal to noise ratio (SNR) of a channel used by the apparatus.

15. The apparatus of claim 14, further comprising:
means for transmitting the logical value to the other apparatus.

16. A computer-program product to support an adaptive user dependent channel state information (CSI) feedback rate in a multi-user wireless communication system, comprising a non-transitory computer-readable medium comprising instructions executable to:
obtain a current channel estimate;
calculate a metric based at least on the current channel estimate and a recent channel estimate communicated to an apparatus; and
compare the metric with a threshold for deciding if a CSI update is to sent to the apparatus.

17. A wireless node that supports an adaptive user dependent channel state information (CSI) feedback rate in a multi-user wireless communication system, comprising:
at least one antenna;
an estimator configured to obtain a current channel estimate;
a circuit configured to calculate a metric based at least on the current channel estimate and a recent channel estimate communicated to an access point; and
another circuit to compare the metric with a threshold for deciding if a CSI update is to be sent to the access point.

18. A method to support an adaptive user dependent channel state information (CSI) feedback rate in a multi-user wireless communication system, comprising:
receiving a current channel estimate and a recent channel estimate from an apparatus;
calculating a metric based at least on the current channel estimate and the recent channel estimate; and
comparing the metric with a threshold for deciding if a request for a CSI update is to be sent to the apparatus.

19. The method of claim 18, wherein the apparatus comprises an access point.

20. The method of claim 18, wherein deciding to request the CSI update is based at least on the metric and time elapsed since a most recent CSI update.

21. The method of claim 18, wherein the threshold is based on a signal to noise ratio (SNR) of a channel.

22. The method of claim 21, wherein deciding if a request for the CSI update is to be sent to the apparatus comprises:
deciding if the CSI request is to be sent to the apparatus based at least on the logical value and time elapsed since a most recent CSI update.

23. The method of claim 18, further comprising:
transmitting, to the apparatus based on the decision, the request for the CSI update.

24. The method of claim 23, wherein the request for the CSI update comprises at least one of a training request message or a channel sounding message.

25. An apparatus that supports an adaptive user dependent channel state information (CSI) feedback rate in a multi-user wireless communication system, comprising:
a receiver configured to obtain a current channel estimate and a recent channel estimate from another apparatus;
a circuit configured to calculate a metric based at least on the current channel estimate and the recent channel estimate; and
another circuit to compare the metric with a threshold to decide if a request for a CSI update is to be sent to the other apparatus.

26. The apparatus of claim 25, comprising an access point.

27. The apparatus of claim 25, wherein deciding to request the CSI update is based at least on the metric and time elapsed since a most recent CSI update.

28. The apparatus of claim 25, wherein the threshold is based on a signal to noise ratio (SNR) of a channel used by the apparatus.

29. The apparatus of claim 28, wherein the other circuit is also configured to:

decide if the request for the channel state information update is to be sent to the other apparatus based at least on the logical value and time elapsed since the last CSI update.

30. The apparatus of claim 25, further comprising:
a transmitter configured to transmit, to the other apparatus based on the decision, the request for the CSI update.

31. The apparatus of claim 30, wherein the request for the CSI update comprises at least one of a training request message or a channel sounding message.

32. An apparatus that supports an adaptive user dependent channel state information (CSI) feedback rate in a multi-user wireless communication system, comprising:
means for obtaining a current channel estimate and a recent channel estimate from another apparatus;
means for calculating a metric based at least on the current channel estimate and the recent channel estimate; and
means for comparing the metric with a threshold for deciding if a request for a CSI update is to be sent to the other apparatus.

33. The apparatus of claim 32, comprising access point.

34. The apparatus of claim 32, wherein deciding to request the CSI update is based at least on the metric and time elapsed since a most recent CSI update.

35. The apparatus of claim 32, wherein the threshold is based on a signal to noise ratio (SNR) of a channel used by the apparatus.

36. The apparatus of claim 35, wherein the means for deciding if a channel state information request is to be sent to the other apparatus comprises:
means for deciding if the request for the CSI update is to be sent to the other apparatus based at least on the logical value and time elapsed since a most recent CSI update.

37. The apparatus of claim 32, further comprising:
means for transmitting, to the other apparatus based on the decision, a request for the CSI update.

38. The apparatus of claim 37, wherein the request for the CSI update comprises at least one of a training request message or a channel sounding message.

39. A computer-program product that supports an adaptive user dependent channel state information (CSI) feedback rate in a multi-user wireless communication system, comprising a non-transitory computer-readable medium comprising instructions executable to:
obtain a current channel estimate and a recent channel estimate from an apparatus;
calculate a metric based at least on the current channel estimate and the recent channel estimate; and
compare the metric with a threshold for deciding if a request for a CSI update is to be sent to the apparatus.

40. An access point that supports an adaptive user dependent channel state information (CSI) feedback rate in a multi-user wireless communication system, comprising:
at least one antenna;
a receiver configured to obtain via the at least one antenna a current channel estimate and a recent channel estimate from a wireless node;
a circuit configured to calculate a metric based at least on the current channel estimate and the recent channel estimate; and
another circuit configured to compare the metric with a threshold to decide if a request for a CSI update is to be sent to the wireless node.

41. The method of claim 1, wherein the metric is calculated according to the following:

$$D_{CSI} = \frac{\|H_{old} - H_{new}\|^2}{\|H_{old}\|\|H_{new}\|}$$

wherein $D_{CSI}$ is the metric, $H_{new}$ is a latest downlink complex channel estimate measured at the first apparatus, and $H_{old}$ is a complex channel estimate most recently fed back to the second apparatus.

42. The method of claim 1, wherein the metric is calculated according to the following:

$$D_{CSI} = \left| \frac{H_{old} \cdot H'_{new}}{\|H_{old}\|} \|H_{new}\| \right|$$

wherein $D_{CSI}$ is the metric, $H_{new}$ is a row vector containing a latest downlink complex channel estimates for a single antenna measured at the first apparatus and $H_{old}$ is a row vector containing downlink complex channel estimates for a single antenna most recently fed back to the second apparatus.

43. The method of claim 1, wherein the metric is calculated according to the following:

$$D_{CSI} = \left| \arg\left( \frac{H_{old} \cdot H'_{new}}{\|H_{old}\|\|H_{new}\|} \right) \right|$$

wherein $D_{CSI}$ is the metric, $H_{new}$ is a latest downlink complex channel estimate for a single antenna measured at the first apparatus and $H_{old}$ is a downlink complex channel estimate for a single antenna most recently fed back to the second apparatus.

* * * * *